United States Patent
Baskerville et al.

(10) Patent No.: US 8,775,402 B2
(45) Date of Patent: Jul. 8, 2014

(54) TRUSTED QUERY NETWORK SYSTEMS AND METHODS

(75) Inventors: Richard Baskerville, Decatur, GA (US); Martin Grace, Atlanta, GA (US); Detmar Straub, Atlanta, GA (US); Carl Stucke, Decatur, GA (US); Vijay Vaishnavi, Snellville, GA (US); Art Vandenberg, Atlanta, GA (US); Robert Sainsbury, Acworth, GA (US); Guangzhi Zheng, Atlanta, GA (US); David Bloomquist, Roswell, GA (US); Michelle Bellard, Stone Mountain, GA (US); Anthony Vance, Woodstock, GA (US)

(73) Assignee: Georgia State University Research Foundation, Inc., Atlanta, GA (US)

( * ) Notice: Subject to any disclaimer, the term of this patent is extended or adjusted under 35 U.S.C. 154(b) by 1622 days.

(21) Appl. No.: 11/839,318

(22) Filed: Aug. 15, 2007

(65) Prior Publication Data

US 2008/0133531 A1    Jun. 5, 2008

Related U.S. Application Data

(60) Provisional application No. 60/837,801, filed on Aug. 15, 2006.

(51) Int. Cl.
*G06F 7/00* (2006.01)
*G06F 17/30* (2006.01)

(52) U.S. Cl.
USPC .......................................... 707/708; 707/713

(58) Field of Classification Search
USPC ......................................... 707/757, 769, 774
See application file for complete search history.

(56) References Cited

U.S. PATENT DOCUMENTS

| | | | | |
|---|---|---|---|---|
| 7,170,999 B1 * | 1/2007 | Kessler et al. | ................ | 380/277 |
| 7,269,736 B2 * | 9/2007 | Howard et al. | ................ | 713/179 |
| 7,328,453 B2 * | 2/2008 | Merkle et al. | ................... | 726/23 |
| 7,367,045 B2 * | 4/2008 | Ofek et al. | ........................ | 726/2 |
| 7,509,491 B1 * | 3/2009 | Wainner et al. | ................ | 713/163 |
| 2007/0074282 A1 * | 3/2007 | Black et al. | ..................... | 726/14 |

OTHER PUBLICATIONS

Silaghi, et al., "Privacy for DisCSP-based Modeling in Multi-Agent Planning", Florida Institute of Technology and Swiss Federal Institute of Technology, 2002.
Silaghi, et al., "Secure Incomplete Multi-party Computation for distributed constraint problems", Florida Institute of Technology, University Klagenfurt, and Kyushu University, 2006, American Association for Artificial Intelligence.
Silaghi, et al. "A web-based Meeting Scheduling Solver with Privacy Guarantees, without Trusted Servers", Florida Institute of Technology and University College Cork, 2004.
Marius-Galin Silaghi, "Solving a distributed CSP with cryptographic mulit-party computations, without revealing constraints and without involving trusted servers", Florida Institute of Technology, pp. 1-15, May 2003.
Marius-Calin Silaghi, "Arithmetic circuit for the first solution of distributed CSPs with cryptographic multi-party computations", Florida Institute of Technology, pp. 1-5, 2003.

* cited by examiner

*Primary Examiner* — Hosain Alam
*Assistant Examiner* — Reza Hosseini
(74) *Attorney, Agent, or Firm* — Thomas | Horstemeyer, LLP

(57) ABSTRACT

Systems and methods for enabling organizations to anonymously share aggregated security assessment results while keeping the raw or private data locally within the organization.

20 Claims, 19 Drawing Sheets

| NODE | POLICY (Pi) | T=1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|
| NODE01 | 9  | 0 | 0 | 0 | 0 | 0 | 0 | 0 | 0 | 1 | 1 | 1 | 1 | 1 | 1 | 1 | 1 | 1 | 1 | 1 | 1 |
| NODE02 | 15 | 0 | 0 | 0 | 0 | 0 | 0 | 1 | 0 | 0 | 0 | 0 | 0 | 0 | 0 | 1 | 1 | 1 | 1 | 1 | 1 |
| NODE03 | 7  | 0 | 0 | 0 | 0 | 0 | 0 | 1 | 1 | 1 | 1 | 1 | 1 | 1 | 1 | 1 | 1 | 1 | 1 | 1 | 1 |
| NODE04 | 11 | 0 | 0 | 0 | 0 | 0 | 1 | 0 | 0 | 0 | 0 | 1 | 1 | 1 | 0 | 1 | 1 | 1 | 1 | 1 | 1 |
| NODE05 | 0  | 0 | 0 | 0 | 0 | 0 | 0 | 0 | 0 | 0 | 0 | 0 | 0 | 0 | 0 | 0 | 0 | 0 | 0 | 0 | 0 |
| NODE06 | 8  | 0 | 0 | 0 | 0 | 0 | 0 | 0 | 1 | 1 | 1 | 1 | 1 | 1 | 1 | 1 | 1 | 1 | 1 | 1 | 1 |
| NODE07 | 0  | 0 | 0 | 0 | 0 | 0 | 0 | 0 | 0 | 0 | 0 | 0 | 0 | 0 | 0 | 0 | 0 | 0 | 0 | 0 | 0 |
| NODE08 | 0  | 0 | 0 | 0 | 0 | 0 | 0 | 0 | 0 | 0 | 0 | 0 | 0 | 0 | 0 | 0 | 0 | 0 | 0 | 0 | 0 |
| NODE09 | 10 | 0 | 0 | 0 | 0 | 0 | 0 | 0 | 0 | 0 | 1 | 1 | 1 | 1 | 1 | 1 | 1 | 1 | 1 | 1 | 1 |
| NODE10 | 9  | 0 | 0 | 0 | 0 | 0 | 0 | 0 | 0 | 1 | 1 | 1 | 1 | 1 | 1 | 1 | 1 | 1 | 1 | 1 | 1 |
| NODE11 | 6  | 0 | 0 | 0 | 0 | 0 | 1 | 1 | 1 | 0 | 0 | 0 | 1 | 1 | 1 | 1 | 1 | 1 | 1 | 1 | 1 |
| NODE12 | 13 | 0 | 0 | 0 | 0 | 0 | 0 | 0 | 0 | 0 | 0 | 0 | 0 | 1 | 1 | 1 | 1 | 1 | 1 | 1 | 1 |
| NODE13 | 12 | 0 | 0 | 0 | 0 | 0 | 0 | 0 | 0 | 0 | 0 | 0 | 1 | 1 | 1 | 1 | 1 | 1 | 1 | 1 | 1 |
| NODE14 | 7  | 0 | 0 | 0 | 0 | 0 | 0 | 1 | 1 | 1 | 1 | 1 | 1 | 1 | 1 | 1 | 1 | 1 | 1 | 1 | 1 |
| NODE15 | 9  | 0 | 0 | 0 | 0 | 0 | 0 | 0 | 0 | 1 | 1 | 1 | 1 | 1 | 1 | 1 | 1 | 1 | 1 | 1 | 1 |
| NODE16 | 17 | 0 | 0 | 0 | 0 | 0 | 0 | 0 | 0 | 0 | 0 | 0 | 0 | 0 | 0 | 0 | 0 | 1 | 1 | 1 | 1 |
| NODE17 | 11 | 0 | 0 | 0 | 0 | 0 | 1 | 0 | 0 | 0 | 0 | 1 | 1 | 1 | 0 | 1 | 1 | 1 | 1 | 1 | 1 |
| NODE18 | 0  | 0 | 0 | 0 | 0 | 0 | 0 | 0 | 0 | 0 | 0 | 0 | 0 | 0 | 0 | 0 | 0 | 0 | 0 | 0 | 0 |
| NODE19 | 14 | 0 | 0 | 0 | 0 | 0 | 0 | 0 | 0 | 0 | 0 | 0 | 0 | 0 | 1 | 1 | 1 | 1 | 1 | 1 | 1 |
| NODE20 | 11 | 0 | 0 | 0 | 0 | 0 | 0 | 0 | 0 | 0 | 0 | 1 | 1 | 1 | 1 | 1 | 1 | 1 | 1 | 1 | 1 |
| ACTUAL # (Y)   | | 0 | 0 | 0 | 0 | 0 | 1 | 3 | 4 | 7 | 8 | 11 | 12 | 13 | 14 | 15 | 15 | 16 | 16 | 16 | 16 |
| POSSIBLE # (X) | | | | | | | | | | | | 11 | 12 | 13 | 14 | 15 | | | | | |

| POLICY (Pi) | | TARGET # (T) | | | | | | | | | | | | | | | | | | | |
|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 20 |
| NODE01 | 14 | 0 | 0 | 0 | 0 | 0 | 0 | 0 | 0 | 0 | 0 | 0 | 0 | 0 | 1 | 1 | 1 | 1 | 1 | 1 | 1 |
| NODE02 | 0  | 0 | 0 | 0 | 0 | 0 | 0 | 0 | 0 | 0 | 0 | 0 | 0 | 0 | 0 | 0 | 0 | 0 | 0 | 0 | 0 |
| NODE03 | 0  | 0 | 0 | 0 | 0 | 0 | 0 | 0 | 0 | 0 | 0 | 0 | 0 | 0 | 0 | 0 | 0 | 0 | 0 | 0 | 0 |
| NODE04 | 16 | 0 | 0 | 0 | 0 | 0 | 0 | 0 | 0 | 0 | 0 | 0 | 0 | 0 | 0 | 0 | 1 | 1 | 1 | 1 | 1 |
| NODE05 | 0  | 0 | 0 | 0 | 0 | 0 | 0 | 0 | 0 | 0 | 0 | 0 | 0 | 0 | 0 | 0 | 0 | 0 | 0 | 0 | 0 |
| NODE06 | 0  | 0 | 0 | 0 | 0 | 0 | 0 | 0 | 0 | 0 | 0 | 0 | 0 | 0 | 0 | 0 | 0 | 0 | 0 | 0 | 0 |
| NODE07 | 16 | 0 | 0 | 0 | 0 | 0 | 0 | 0 | 0 | 0 | 0 | 0 | 0 | 0 | 0 | 0 | 1 | 1 | 1 | 1 | 1 |
| NODE08 | 16 | 0 | 0 | 0 | 0 | 0 | 0 | 0 | 0 | 0 | 0 | 0 | 0 | 0 | 0 | 0 | 1 | 1 | 1 | 1 | 1 |
| NODE09 | 0  | 0 | 0 | 0 | 0 | 0 | 0 | 0 | 0 | 0 | 0 | 0 | 0 | 0 | 0 | 0 | 0 | 0 | 0 | 0 | 0 |
| NODE10 | 8  | 0 | 0 | 0 | 0 | 0 | 0 | 0 | 0 | 0 | 1 | 1 | 1 | 1 | 1 | 1 | 1 | 1 | 1 | 1 | 1 |
| NODE11 | 10 | 0 | 0 | 0 | 0 | 0 | 0 | 0 | 1 | 0 | 1 | 1 | 1 | 1 | 1 | 1 | 1 | 1 | 1 | 1 | 1 |
| NODE12 | 4  | 0 | 0 | 0 | 1 | 1 | 0 | 1 | 1 | 1 | 1 | 1 | 1 | 1 | 1 | 1 | 1 | 1 | 1 | 1 | 1 |
| NODE13 | 5  | 0 | 0 | 0 | 0 | 1 | 1 | 1 | 1 | 1 | 1 | 1 | 1 | 1 | 1 | 1 | 1 | 1 | 1 | 1 | 1 |
| NODE14 | 10 | 0 | 0 | 0 | 0 | 0 | 0 | 0 | 0 | 0 | 1 | 1 | 1 | 1 | 1 | 1 | 1 | 1 | 1 | 1 | 1 |
| NODE15 | 0  | 0 | 0 | 0 | 0 | 0 | 0 | 0 | 0 | 0 | 0 | 0 | 0 | 0 | 0 | 0 | 0 | 0 | 0 | 0 | 0 |
| NODE16 | 0  | 0 | 0 | 0 | 0 | 0 | 0 | 0 | 0 | 0 | 0 | 0 | 0 | 0 | 0 | 0 | 0 | 0 | 0 | 0 | 0 |
| NODE17 | 5  | 0 | 0 | 0 | 0 | 1 | 1 | 1 | 1 | 1 | 1 | 1 | 1 | 1 | 1 | 1 | 1 | 1 | 1 | 1 | 1 |
| NODE18 | 10 | 0 | 0 | 0 | 0 | 0 | 0 | 0 | 0 | 0 | 1 | 1 | 1 | 1 | 1 | 1 | 1 | 1 | 1 | 1 | 1 |
| NODE19 | 15 | 0 | 0 | 0 | 0 | 0 | 0 | 0 | 0 | 0 | 0 | 0 | 0 | 0 | 0 | 1 | 1 | 1 | 1 | 1 | 1 |
| NODE20 | 17 | 0 | 0 | 0 | 0 | 0 | 0 | 0 | 0 | 0 | 0 | 0 | 0 | 0 | 0 | 0 | 1 | 1 | 1 | 1 | 1 |
| ACTUAL # (Y) | | 0 | 0 | 0 | 1 | 3 | 3 | 4 | 5 | 5 | 8 | 8 | 8 | 8 | 9 | 10 | 13 | 13 | 13 | 13 | 13 |
| POSSIBLE # (X) | | 0 | 0 | 0 | 1 | 3 | 3 | 4 | 5 | 5 | 8 | 8 | 8 | 8 | 9 | 10 | 13 | 13 | 13 | 13 | 13 |

| TQN: PARTICIPANTS POLICY PROBE AND TRAVEL PATH DETERMINATION – MICROSOFT INTERNET EXPLORER | | |
|---|---|---|
| ADDRESS | HTTP://131.96.101.141/TQNCOORDINATION/MONITOR/TEST_PARTICIPANTS.ASPX | ▽  →GO |

500

CHOOSE NETWORK: XML01, ACCESS01

CURRENT NETWORK: XML01

TQN CURRENT REGISTRANTS (ALL PARTICIPANTS):   NOTE: 0 MEANS NO PARTICIPANTS

| SITEID 502 | SITESERVICEURL 504 | NETWORKID 506 | POLICY 508 | WILL PARTICIPATE 510 |
|---|---|---|---|---|
| SITE1001 | HTTP://131.96.101.141/TQN001/TQNSERVICE.ASMX | XML01 | 4 | 1 |
| SITE1002 | HTTP://131.96.101.141/TQN002/TQNSERVICE.ASMX | XML01 | 2 | 1 |
| SITE1003 | HTTP://131.96.101.141/TQN003/TQNSERVICE.ASMX | XML01 | 6 | 0 |
| SITE1004 | HTTP://131.96.101.141/TQN004/TQNSERVICE.ASMX | XML01 | 4 | 1 |
| SITE1005 | HTTP://131.96.101.141/TQN005/TQNSERVICE.ASMX | XML01 | 4 | 1 |
| SITE1006 | HTTP://131.96.101.141/TQN006/TQNSERVICE.ASMX | XML01 | 0 | 0 |

} 512

| CALCULATE | FINAL NUMBER OF PARTICIPANTS: 4 FINAL RANDOMIZED PATH: SITE1005, SITE1004, SITE1001, SITE1002 |
|---|---|

SIZE - REVENUE
HOW MUCH REVENUE DID YOUR COMPANY EARN IN THE LAST 12 MONTHS?
○ SMALL (LESS THAN $1,000,000)
○ MEDIUM ($1,000,000 - $10,000,000)
○ LARGE (MORE THAN $10,000,000)

SIZE - ASSETS
WHAT ARE YOUR COMPANIES ASSETS?
○ SMALL (LESS THAN $1,000,000)
○ MEDIUM ($1,000,000 - $10,000,000)
○ LARGE (MORE THAN $10,000,000)

SIZE - EMPLOYEES
HOW MANY PEOPLE ARE EMPLOYEES ARE EMPLOYED AT YOUR ORGANIZATION?
○ SMALL (LESS THAN 100)
○ MEDIUM (100 – 1,000)
○ LARGE (MORE THAN $1,000)

ORGANIZATION
SELECT THE INDUSTRY THAT BEST FITS YOUR ORGANIZATION
MINING
UTILITIES
CONSTRUCTION

EXPERIENCE
HOW MANY YEARS EXPERIENCE DO YOU HAVE?

HOW MANY YEARS EXPERIENCE DO YOU HAVE IN JOBS WHERE RISK MANAGEMENT OR INFORMATION SECURITY WERE INCLUDED IN YOUR RESPONSIBILITY?

☐ TESTING   NEXT

1002 — QUESTION 1
PLEASE ESTIMATE THE NUMBER OF INCIDENTS THAT OCCURRED IN THE LAST 12 MONTHS
NUMBER OF INCIDENTS [ ]

1004 — QUESTION 2
WHAT ARE YOUR COMPANIES ASSETS?
INCIDENTS   PERCENTAGE
ACCIDENTAL    [ ]   [ ]
DELIBERATE    [ ]   [ ]
CANNOT SAY    [ ]   [ ]
TOTAL         XXX

1006 — QUESTION 3
WHAT TYPE OF ACCIDENT?
INCIDENTS   PERCENTAGE
CATASTROPHE   [ ]   [ ]
ERROR         [ ]   [ ]
CANNOT SAY    [ ]   [ ]
TOTAL         XXX

1008 — QUESTION 4
WHAT WAS THE PRIMARY METHOD OF ATTACK?
INCIDENTS   PERCENTAGE
PHYSICAL      [ ]   [ ]
FALSIFICATION [ ]   [ ]
MALICIOUS     [ ]   [ ]
CRACKING      [ ]   [ ]
CANNOT SAY    [ ]   [ ]
TOTAL         XXX

1010 — DEFINITIONS

☐ TESTING    NEXT

1100

| DEFINITIONS

AN INCIDENT IS A KNOWN COMPROMISE TO A SYSTEM, WHETHER ACCIDENTAL OR INTENTIONAL

A CATASTROPHE IS AN INCIDENT RELATED TO A LARGER OCCURRENCE INSIDE OR OUTSIDE THE COMPANY

AN ERROR IS AN UNINTENTIONAL COMPROMISE BY A USER

A PHYSICAL INCIDENT IS A COMPROMISE INVOLVING PHYSICAL ACCESS OR ASSETS

A FALSIFICATION INCIDENT INVOLVES THE INTENTIONAL ALTERING OF INFORMATION IN A SYSTEM

A MALICIOUS INCIDENT IS THE INTENTIONAL DISRUPTION OF A SYSTEM PERFORMANCE

A CRACKING INCIDENT INVOLVES BREAKING INTO A SYSTEM TO EXTRACT INFORMATION

FIG. 11

QUESTION 9
ESTIMATE THE COST OF THE MOST
EXPENSIVE MALICIOUS INCIDENT
YOU HAD LAST YEAR

COST OF THE
INCIDENT [ ]

QUESTION 10
OF INCIDENTS [ ] [ ] [ ] [ ] [ ]

RANGES  <$20,000  $20,000 - $40,000  $40,000 - $60,000  $60,001 - $100,000  > $100,000

50

OF
INCIDENTS 0
    0    100,000    200,000

QUESTION 11
ESTIMATE THE COST OF THE MOST
EXPENSIVE HACKING INCIDENT YOU
HAD LAST YEAR

COST OF THE
INCIDENT [ ]

QUESTION 12
OF INCIDENTS [ ] [ ] [ ] [ ] [ ]

RANGES  <$0  $0 -$0  $0 -$0  $0 -$0  > $0

25

OF
INCIDENTS 0
    0    0    0

NEXT

TRUSTED QUERY NETWORK SYSTEMS AND METHODS

CROSS-REFERENCE TO RELATED APPLICATION

This application claims priority to copending U.S. provisional application entitled, "Trusted Query Network (TQN) Systems and Methods," having Ser. No. 60/837,801, filed Aug. 15, 2006, which is entirely incorporated herein by reference.

TECHNICAL FIELD

The present disclosure is generally related to information technology and, more particularly, is related to risk management in information technology.

BACKGROUND

Few would argue against an assertion that information security is important for the information age. Indeed security ranked as the top 2005 business priority by 82% of 300 business technology managers polled by Information Week. Security is such an essential attribute of information technology that it is considered by some to be a key business enabler for the global economy. But despite the priorities, the high visibility, and the monumental growth in the information security industry, security losses and cyber attacks are still a crippling problem for information systems.

Security losses are a crippling problem for information systems, often because of poor security investment decisions. To make well informed decisions, there is a need for information security risk management benchmarking that requires the availability of industry-wide data on security breaches and losses. One reason for the non-availability of such data is that often the disclosure of such data carries the risk of damage to the reputation of the organization.

Also, another problem limiting success of security measures in current systems is not only the technology for information security but also lack of knowledge on information security risk management. Information Technology (IT) departments may create a false sense of security by overspending in some areas, such as large purchases of security technology and software, while overlooking other areas, such as staff quality and management. Overall, one result may be an under investment in information security despite the high priority. These poor security investment decisions are often the result of inadequate research in areas like security economics and risk assessment.

Many current practices in information risk assessment exemplify this lack of objective knowledge on information security risk management. Often, risk measurements can include a mix of vulnerability data and unquantifiable gut feelings that are difficult to analyze and do not satisfy financial officers. While many people recognize that security is a capital investment decision, and as such should be viewed as a cost-benefit determination, the economic analysis used by many executives lacks formal quantification and is inhabited by pre-defined security budgets, perceptions of best practices, and "must-do" requirements of regulations and auditors. These management practices can make information security more of a "folk art" than a profession. Clearly, managers of information systems should progress beyond the "gut feel" approach to information security, and use metrics to prioritize security threats and vulnerabilities. The development of such metrics typically requires the availability of empirical information that includes internal and external data, of both historical and forecast types on security breaches and losses. Without this basic data, objective risk analysis is impractical.

There are intractable problems that block the development of empirical databases of security risk information. One problem is the lack of agreed terminology and labels for the underlying concepts being measured. The terms in the information security lexicon are generally neither precise nor distinct. For instance, terms like incident, threat, risk, vulnerability, and control are often used differently by various authorities, making it difficult to collect basic metrics for counting events when the terms are imprecise.

A second problem is that basic data is often unavailable because the events being described by the data represent reports of security breaches and losses. There are often dangers to organizations that disclose or share this data. For instance, public disclosures of such breaches are not merely embarrassments, but may damage the reputation of the organization. Moreover, for commercial organizations, this may lead to capitalization losses. Attempts to share this data privately among industry groups may violate anti-trust laws designed to deter collusion among competitors, and where government organizations participate, may become publicly exposed through freedom-of-information laws. As a result, disclosures may be inhibited.

Despite these problems, information security management remains as essentially a risk reduction program. To manage risks, risks are typically measured. Metrics are therefore important to information security management, and the intractable problems described above should be solved. Not surprisingly, quantitative information systems risk management was identified by the Computing Research Association in 2004 as one of the four "grand research challenges in information security and assurance."

Recapping, two basic problems in risk management are identified above, namely that of imprecise data and disclosure inhibitions. Disclosure inhibition is often an inner impediment to the free expression of information. A responsible organizational action may serve to prevent expected or unexpected damages as a reaction to the disclosure. One way to define the underlying problem is by using the "The Law of Private Data Disclosure," which can be expressed as follows:

$$\text{Private Data Disclosure} \Rightarrow \text{(IMPLIES) Risk}$$

That is, information disclosure implies a risk to the discloser. The risk may vary in scale from trivial to fatal, but most if not all disclosures involve risk.

SUMMARY

Embodiments of the present disclosure provide trusted query network (TQN) systems and methods. Briefly described, one method embodiment, among others, comprises receiving at a computing device a query request over a network, the query request comprising a query; sending the query with obfuscating data along a randomized path to plural participants over the network, each of the plural participants adding its private data to the obfuscating data before sending to the next participant along the randomized path, the private data added in response to the query; receiving at the computing device an obfuscated result after participation by each of the plural participants in the randomized path, the obfuscated result including the cumulative private data hidden from the plural participants by the obfuscating data; and removing at the computing device the obfuscating data to provide a query result, the query result comprising the cumulative private data.

The present disclosure can also be viewed as providing TQN systems. In this regard, one system embodiment comprises a first computing device corresponding to a first participant, the first computing device configured to send a query request comprising a query; a second computing device corresponding to a second participant, wherein anonymity between the first participant and the second participant is preserved; and a trusted query network (TQN) coordinator, the TQN coordinator configured to: receive the query request over a network in which the second computing device is also coupled; and send the query and obfuscating data to the second computing device, the obfuscating data veiling from the first and second participants actual participation in the query, wherein the second computing device is configured to receive the query and the obfuscating data, responsive to the query, add first private data to the obfuscating data to provide a first obfuscated result, and send the first obfuscated result and the query to the first computing device, wherein the first computing device is configured to receive the query and the first obfuscated result, responsive to the query, add second private data to the first obfuscated result to provide a second obfuscated result, and send the second obfuscated result to the TQN coordinator, wherein the TQN coordinator is further configured to receive the second obfuscated result, remove the obfuscating data, and provide a final result to the first and second computing device, the final result comprising an accumulation of the first and second private data.

Other systems, methods, features, and advantages of the present disclosure will be or become apparent to one with skill in the art upon examination of the following drawings and detailed description. It is intended that all such additional systems, methods, features, and advantages be included within this description, and be within the scope of the present disclosure.

BRIEF DESCRIPTION OF THE DRAWINGS

Many aspects of trusted query network (TQN) systems and methods can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 4A-4B are screen diagrams that illustrate an embodiment of exemplary quorum determination processing in the TQN system shown in FIG. 1.

FIG. 5 is a screen diagram that illustrates one embodiment of an exemplary monitor GUI that can be used by an administrator to monitor policy probing by the TQN coordinator in the TQN system shown in FIG. 1.

FIGS. 9-14 are screen diagrams that illustrate an embodiment of a survey tool embodied by various GUIs that are implemented by the computing device shown in FIG. 8.

DETAILED DESCRIPTION

Figure 1:
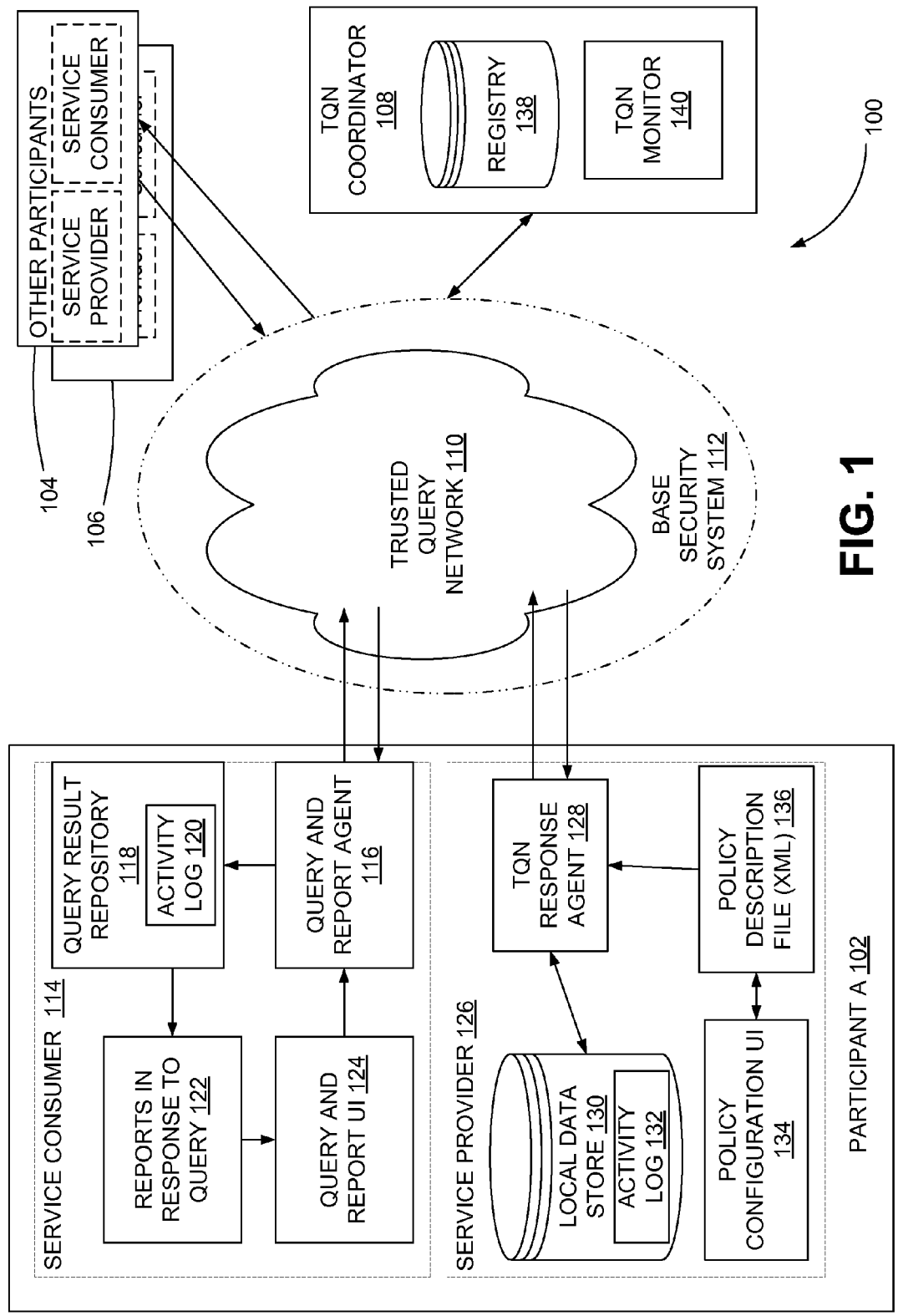
FIG. 1 is a block diagram of an embodiment of a trusted query network (TQN) system.

Two basic problems in risk management are identified in the background above, namely that of imprecise data and disclosure inhibitions. Various embodiments of trusted query network (TQN) systems and methods are disclosed herein that address directly or indirectly these and other problems existing in risk management today. For instance, such TQN systems and methods described herein directly address the problem of disclosure inhibition (e.g., how to enable participants or organizations to participate in the benefits of shared information, yet avoid the damaging risks inherent in disclosure itself), which may lead to increased sharing and release of data that will in turn ameliorate data imprecision problems. In one embodiment, the TQN systems and methods eliminate disclosure of source or raw or private data while still making available aggregated results, enabling organizations to anonymously share aggregated security assessment results while keeping the raw or private data locally within the organization.

Aggregate data refers to the notion that an individual answer or result is not traceable. The TQN systems and methods provide for the non-traceability of the aggregate data back to any one particular site. One risk in sharing data has been the exposure due to identifying the source site, and the risk of reputation or market share deterioration. Since the data is aggregated (from the start, with obfuscating data—randomly initialized—added to the circulating query), there is a very low risk of exposure. However, in some embodiments, the aggregate data may be encrypted according to one of a plurality of known mechanisms. For instance, secure transmissions (such as https and/or via Security Assertion Markup Language (SAML) messages) may be implemented as well as possible message encapsulations using signed certificates.

Various embodiments of TQN systems and methods are distinguished from the previous work by addressing the disclosure element in the Law of Private Data Disclosure. For instance, various embodiments of the TQN systems and methods directly address the reduction of the disclosure itself, and indirectly reduce the risk resulting from the disclosure by reducing the disclosure. One or more embodiments of the TQN systems and methods also overcome disclosure inhibition by avoiding the disclosure itself according to the following avoidance solution:

$$\text{Disclose no private data} \wedge \text{(AND) Disclose only aggregate data}$$

The availability of empirical risk statistics without disclosure may lead to a widely patronized repository of IT risk-loss analyses that can address one intractable, grand challenge to information security and assurance. For instance, such a methodology enables system managers to answer some of the following questions: To what extent do attacks against certain vulnerabilities cause damage? What are the monetary losses for unusable systems, opportunity costs, and personnel expenses to make organizations whole again? What are the antecedent conditions that lead to higher or lower losses? What antecedent conditions comprise best practices profile for successful IT risk management?

Much of the existing work in this problem area is limited because it presents partial solutions. Such a limitation is inherent because the work seeks to reduce the risk inherent in private data disclosure (rather than to avoid such disclosure). One way to illustrate this limitation is by delineating various attributes on which certain embodiments of the TQN systems and methods are at least partially based, which include properties and features of a data sharing network of participating organizations preferably used by an ideal solution. For instance, one or more of the following features provide an exemplary, yet non-limiting, illustration of attributes, properties and features that are preferably used in an ideal solution: (1) Guaranteed anonymity: the network architecture guarantees the anonymity of participating organizations, and completely shields an information provider's identity; (2) Trust: participating in the network means trusting on all participants, as well as gaining trust from all participants; (3) Managed and flexible sharing of information based on policies: information sharing is preferably based on flexible configuration of explicit policies that define the level of sharing and on agents that execute these policies automatically; (4) Total control of data (participation is encouraged if no individual organizational data is permanently held anywhere other than at a local organization's site). In short, organizations control all their own data and can trust the system to fully and completely manage their data disclosure risk; (5) Shared benefits: query (research) results are shared by all participants, quickly and safely. The high level of federated trust (participants are authenticated, but anonymity is preserved) provides confidence that information contributed is of high value and can be contributed safely; (6) P2P (peer-to-peer) spirit: the more contributed, the more gained. Levels of contribution and access of information are consistent. This encourages participants to share to gain greater benefits; (7) Secure network: while anonymity is preserved, participants have assurance that access to the network is highly secure. In addition, all federation participants are well vetted to the satisfaction of all; (8) Scalability: Given the requirement that aggregated data is what encourages/promotes sharing, the architecture supports potentially large sets of participants and data aggregations.

Certain embodiments of TQN systems and methods provide a complete solution to sharing sensitive security data by entirely avoiding the risk implied by The Law of Private Data Disclosure. That is, one solution is implementing a complete avoidance solution, represented below as follows:

(BECAUSE) Private Data Disclosure $\Rightarrow$ Risk

∴ (THEREFORE) Disclose no private data $\wedge$ Disclose only aggregate data

The equation above poses basic requirements that a network architecture of various embodiments of the TQN systems and methods possesses and/or implements: (1) Guaranteed anonymity, (2) Federated trust, (3) Local storage of data, (4) Source and record level privacy, (5) Secure query communication protocol, and (6) Scalability.

Explaining further, first, the network architecture (system) guarantees anonymity of participating organizations. Second, while anonymity is preserved, participants have assurance through federated trust that access to the system is highly secure such that all participants are vetted, providing confidence that contributed information is of high value. Third, in order to encourage participation, local storage of data is practiced with no individual organizational data held by a third party. Fourth, source and record level privacy is guaranteed through aggregation mechanisms so that participants have zero to low risk of sensitive data disclosure. Fifth, a secure query communication protocol is used to transport queries and information. Finally, the system is scalable, addressing a distributed peer to peer model, with federated trust among many, autonomous organizations, and supporting multiple, evolving queries from many participants. If these requirements are implemented, the Law of Private Data Disclosure is met and organizations can trust the system to protect their risk-loss data.

One or more embodiments of a TQN system comprises a distributed and peer-to-peer architecture for risk data generation, aggregation, management and analysis. A TQN network protocol provides the communication mechanism for the architecture. Participating organizations or entities store their own risk data locally, with complete control over its access and release (hence no reliance on a third party). Since it is unnecessary to trust a third party, and there is no data access except where an entity chooses to release its data as included in an aggregated data set, a high level of organizational participation can be expected. In turn, any organization that participates by contributing data in turn obtains valuable information from other organizations (in aggregate) quickly and effectively for an emergent decision. The benefits for participants are substantial, while the security threat in releasing their data and so revealing any vulnerabilities or sustaining reputation loss or incurring commercial market loss is extremely remote.

The various embodiments of the TQN systems and methods, which in one embodiment comprises a distributed design for TQN, a data sharing network, has numerous strengths that can benefit organizations. Sensitive risk management data is kept locally at each participant's site and not entrusted to a third party. Participating organizations can have complete autonomy in implementing any level of security and privacy measures they choose to protect their own data. In one embodiment, communications with the TQN system are implemented through highly secure PKI (Public Key Infrastructure) based components, among others, protecting both system components and participants. Compared to central repositories, where a third party is entrusted with valuable organizational data, there is unlikely to be similar security and privacy concerns when the TQN systems and methods are implemented. The TQN systems and methods assure the anonymity of data providers since query participants are not required to disclose any company identifying information and all network addresses are removed and reassigned randomly through an "anonymous" network process.

The various embodiments of the TQN systems and methods also provide a systematic way for organizations to evaluate, model and collect IT risk related data, which traditionally are not recorded by many companies. Thus, their enrollment in TQN will help them to understand and analyze their IT investments in many ways.

The various embodiments of the TQN systems and methods provide a different approach to addressing various limitations that prevent organizations from collaborating in generating objective information on security breaches and associated losses. Certain approaches of these various embodiments eliminates the disclosure of such data by organizations and thus eliminates or significantly mitigates the risk of public disclosure that can have severe effects on their reputation. Further, the approach used by TQN systems and methods may lead to needed metrics and benchmark data for enabling and improving information security risk management.

In some embodiments, the TQN system may comprise an underlying infrastructure based, at least in part, on well-known Shibboleth architectures. Shibboleth is a project of Internet2/MACE, and comprises developing architectures, policy structures, practical technologies, and an open source implementation to support inter-organization sharing of web resources subject to access controls. For instance, certain embodiments of TQN systems may be implemented based on SAML. Shibboleth uses OpenSAML for message and assertion formats based on SAML developed by the OASIS Security Services Technical Committee.

Some important concepts within Shibboleth include federated administration. An identity provider organization (participant) provides attributes about a participant to the service provider (broker). A trust policy exists between participating organizations, based not on explicit identification of an individual, but rather that each organization is vouching for individuals as being authenticated members of the organization. The identity provider authenticates its own users, retaining control over user identities. Another feature of Shibboleth includes access control based on attributes. Access control decisions are made using attributes that a participant organization chooses to release, allowing participants complete control of characterizing information. Another feature includes active management of privacy. The participant organization controls what information is released to the service provider (broker). A typical default is merely "member of participant organization". Individuals can manage attribute release via a web-based user interface. Additionally, a feature of Shibboleth includes a framework for multiple, scaleable trust and policy sets (federations). Shibboleth uses a federation concept to specify a set of parties who have agreed to a common set of policies. A participating organization can be in multiple federations, providing flexibility when potentially different situations require different policy sets. A standard (yet extensible) attribute value vocabulary is also found in Shibboleth. Shibboleth has defined a standard set of attributes—attributes can be extended through definition of additional objects.

In some embodiments, while SAML is specifically designed for transmitting security assertions, implementations of the TQN system may include public-key infrastructure signed messages, or solutions using https, kerberos like ticket-granting solutions, or combinations (e.g., https along with PKI encrypted messages so that not only is the message encrypted, but it is transmitted via trusted https paths). One skilled in the art should understand in the context of this disclosure that other infrastructures and/or standards may be used in some embodiments.

In one embodiment, the TQN system generally comprises six basic logical components: (1) TQN Protocol, (2) TQN message, (3) TQN response agent, (4) TQN coordinator, (5) Base security and (6) Query and report agent. Each of these logical components is described below. Some embodiments may comprise fewer or greater number of components. Other features of some embodiments of TQN systems and methods includes TQN authenticated logins, data release agent(s), policy configuration interface(s) to manage attribute release, one or more standards for a policy description file, and query report agent(s), as well as various TQN protocol extensions for more complex queries of security incident data that are expected from participants. Note that references below to communications among the participants or organizations and the TQN coordinator refer to communications among devices, such as computing devices, associated with the respective participant, with the understanding that such communications may be implemented automatically unless explained otherwise.

FIG. 1 is a logical block diagram of an embodiment of a TQN system 100. The TQN system 100 comprises a participant entity 102 (e.g., Participant A) in addition to one or more other participant entities 104 and 106, a TQN coordinator 108, and a TQ network 110 over which the various components communicate. The participant entities (herein, also participants or organizations) 102, 104, 106 and the TQN coordinator 108, as indicated above, comprise one or more computing devices that provide, with and/or without user interaction, processing for the respective participant. The TQ network 110 includes, or is used in cooperation with, a base security system 112. The base security system 112 provides for authenticated, but privacy preserving, pseudonymous access to the network 110, which leverages the local, autonomous authentication/authorization mechanisms of federated participants, but may optionally be established as a standalone authentication/authorization dedicated to TQN (e.g., entirely independent of any local authentication/authorization). Note that the functionality of the various blocks (e.g., modules of code, devices, etc.) shown in FIG. 1 can be combined in some embodiments, or distributed among a greater number of blocks in others. Further, the blocks shown in FIG. 1 are not limited to the host in which they are shown, but may be configured in some embodiments for standalone operation or in conjunction with other devices.

The participant 102 comprises in one embodiment a service consumer 114 (also referred to as service consumer logic) and service provider 126 (also referred to as service provider logic). The service consumer 114 of participant 102 (and other participants 104 and 106, though not necessarily limited as such) comprises a query and report agent 116 that interfaces to the TQ network 110, and a query result repository 118 that is coupled to the query and report agent 116. The query result repository 118 comprises an activity log 120, although in some embodiments, the activity log 120 may be stored elsewhere in some embodiments. The service consumer 114 further comprises of reports in response to query 122 coupled to the query result repository 118 and to a query and report user interface (UI) 124. The query and report UI 124 is coupled to the query and report agent 116.

In one embodiment, the service provider 126 of participant 102 (and in some embodiments, of other participants 104 and 106) comprises a TQN response agent 128 as an interface to the TQ network 110, the TQN response agent 128 coupled to a local data store 130, which includes an activity log 132. The TQN response agent 128 is also coupled to a policy description file (XML) 136, which is coupled to a policy configuration UI 134.

The TQN coordinator 108 provides supporting services that are required to be performed independently from the participants 102, 104, and 106. The TQN coordinator 108 comprises a service site registry 138 to provide a mapping between a real, networked attached service site (URI) and a unique, pseudonymous identification. The service site registry 138 also serves as a record of federation participants. The service site registry 138 "join" process is handled, in one embodiment, out-of-band and off-line to ensure that anonymity of participants is maintained, though not limited to out-of-band and/or off-line implementations. The TQN coordinator 108 also comprises a TQN monitor 140 responsible for query processing at the beginning and the end of a query, with functions including traveling path randomization, query result propagation, data obfuscation addition, and query logging.

In one embodiment, the TQN coordinator 108 comprises an independent/neutral (secure) system to provide supporting services, and may be managed by a security provider such as Verisign. That is, the TQN coordinator 108 is deliberately independent from the service consumer 114 and service provider 126, thus increasing security by separation of identity information from data.

Referring to the service provider 126, the TQN response agent 128 is responsible for responding to queries within the TQN system 100. The TQN response agent 128 evaluates an incoming query message from the network 110 against its corresponding organization policy, presents the policy configuration UI 134 (or effects its presentation), filters data based on policy established locally by each participant 102, transmits a TQN message to the next destination defined in the message, and maintains activity logs 132 in the local data store 130 on all query processing and response activities. The TQN response agent's behavior can be automated based on a data release policy, although in some alternative embodiments, user (e.g., administrator) interaction may be involved at least in part.

Such a policy can be described and defined using, in one embodiment, an extensive markup language (XML) based policy description file 136 and associated language, though not limited to XML (e.g., other protocols and/or standards for data delivery may be used). The policy description file 136 captures the business rules that reflect the organization's company policy. Using the policy description file 136, organizations can flexibly release data based on such factors as query type, responses from other participants, characteristics of cumulating query results, and number of responding participants. The policy can be defined using the policy configuration UI 134 for high-level management of the policy.

At the service consumer side, the query and report agent 116 prepares the query request (and query) through an automated process, or in some embodiments, through user interaction. Activity logs 120 are maintained in the query result repository 118 for some or all data integration and analysis activities. The reports in response to query 122 comprise response data for reports or further analysis. The query and report UI 124 comprises a user interface used in cooperation with the query and report agent 116 to present (e.g., format) the query report in some embodiments.

Although the service consumer 114 and service provider 126 are shown in FIG. 1 as implemented in a single computing device, the service consumer 114 and the service provider 126 can be implemented in separate computing devices in some embodiments (e.g., coupled over a local area network), or functionality of the same can be combined in a single computing device. For instance, the service consumer 114 may be implemented in a web server and application server, whereas the service consumer 126 may be implemented as a client program (e.g., running on a windows based or web-based computer).

Guaranteed anonymity is provided through a TQN method or protocol. The TQN protocol is based on the proposition that only the information aggregated on a group basis can be disclosed. In this way, individual data is embedded in a result that is not directly associated with any one participant; thus the identity of an information provider is preserved. In general, one general method embodiment can be described as follows: a user submits a query request (e.g., the query request comprising the query), and upon receiving the request, the TQN coordinator 108 (e.g., an independent service) validates the request (e.g., the requesting participant), probes participation policies from all registered sites, and determines a participant quorum for the current query. Then, the TQN coordinator 108 initializes a query message, establishes a random query routing path, creates initial obfuscated data, and sends the message to a random first site. The message travels among all participant sites along the random query path. When all participants have responded to the query, the message returns to the TQN coordinator 108. The TQN coordinator 108 can determine whether to resend the query to all, or at least a portion, of the participants or other participants (e.g., to improve the data accuracy, increase the data pool, etc.). Last, the TQN coordinator 108 calculates the correct result by removing obfuscation data, and makes the result available to all participant sites.

Figure 2:
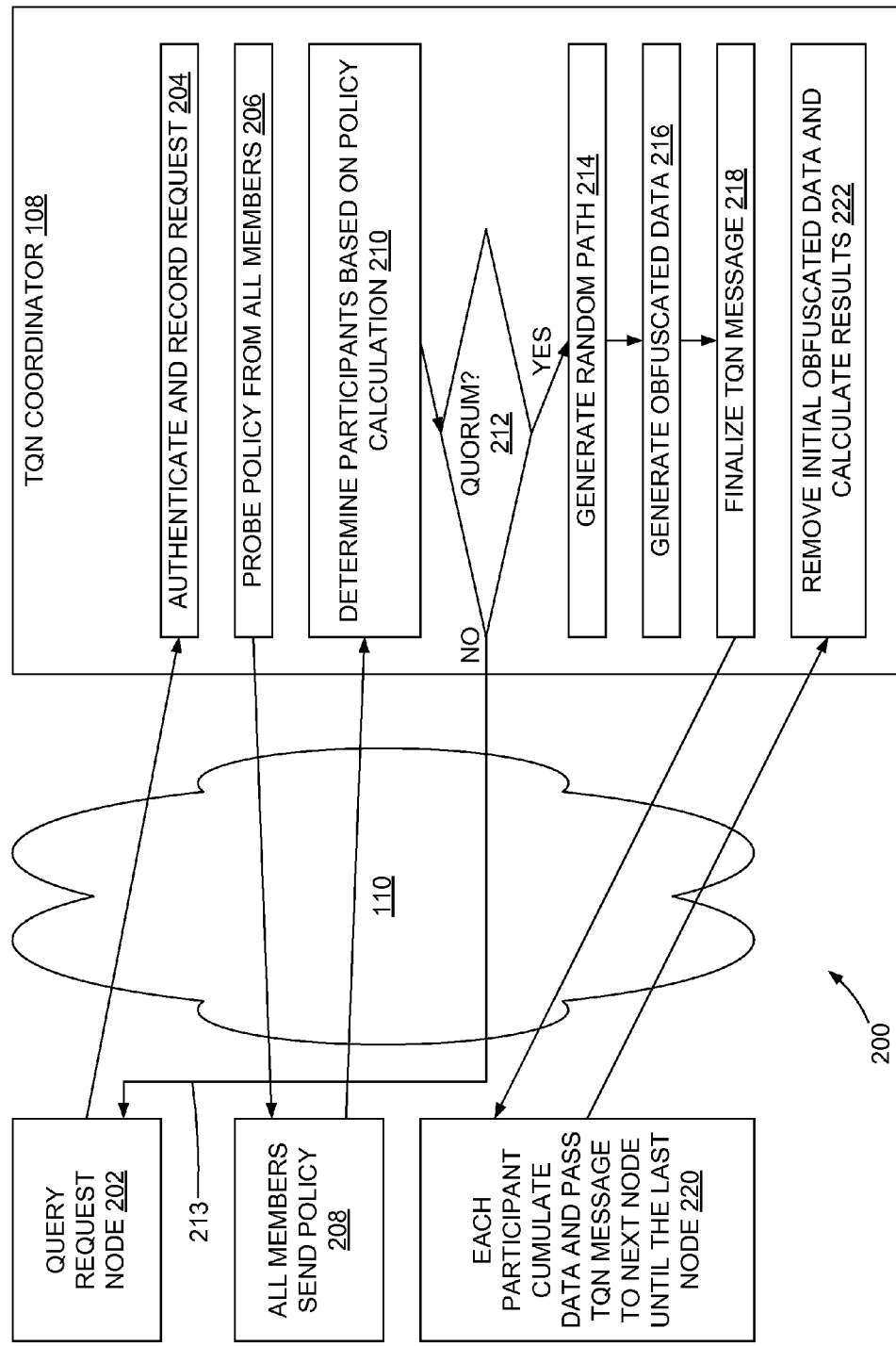
FIG. 2 is a block diagram of a TQN protocol or method implemented by the TQN system shown in FIG. 1.

FIG. 2 is a flow diagram that illustrates one embodiment for a TQN protocol or TQN method 200. Table 1 below, read in the context of the protocol 200, provides one illustrative example of a simple implementation of the protocol 200. The title shown in Table 1 means: "What is total number (sum) of incident type X that occurred during the past year? Calculate the total number of incidents per responder node as number (sum or total) for a respective count." Note that in some embodiments, the average can be provided to further hide the source data. In Table 1, the sum or total is the aggregated result, and count refers to the number of participants who provided data. Additionally, a node comprises a participating unit (e.g., participant 102, 104, 106, etc.) or service site that provides data. For instance, an organization (e.g., participant A 102 in FIG. 1) may be a node, or in embodiments where the TQN system 100 is implemented within an organization, various entities within the organization (e.g., departments) may each comprise a node.

Referring to FIG. 2 and Table 1 below, a query, Q, is issued in the form of a query request by any participant node for an aggregated result, R (202). The query is sent to the TQN coordinator 108 for pre-processing. Upon receiving the query request, Q, the TQN coordinator 108 authenticates and records the request (204), and queries (e.g., probes) all nodes (including the initiator of the query) for their release policies and service availability (206).

Figure 3:
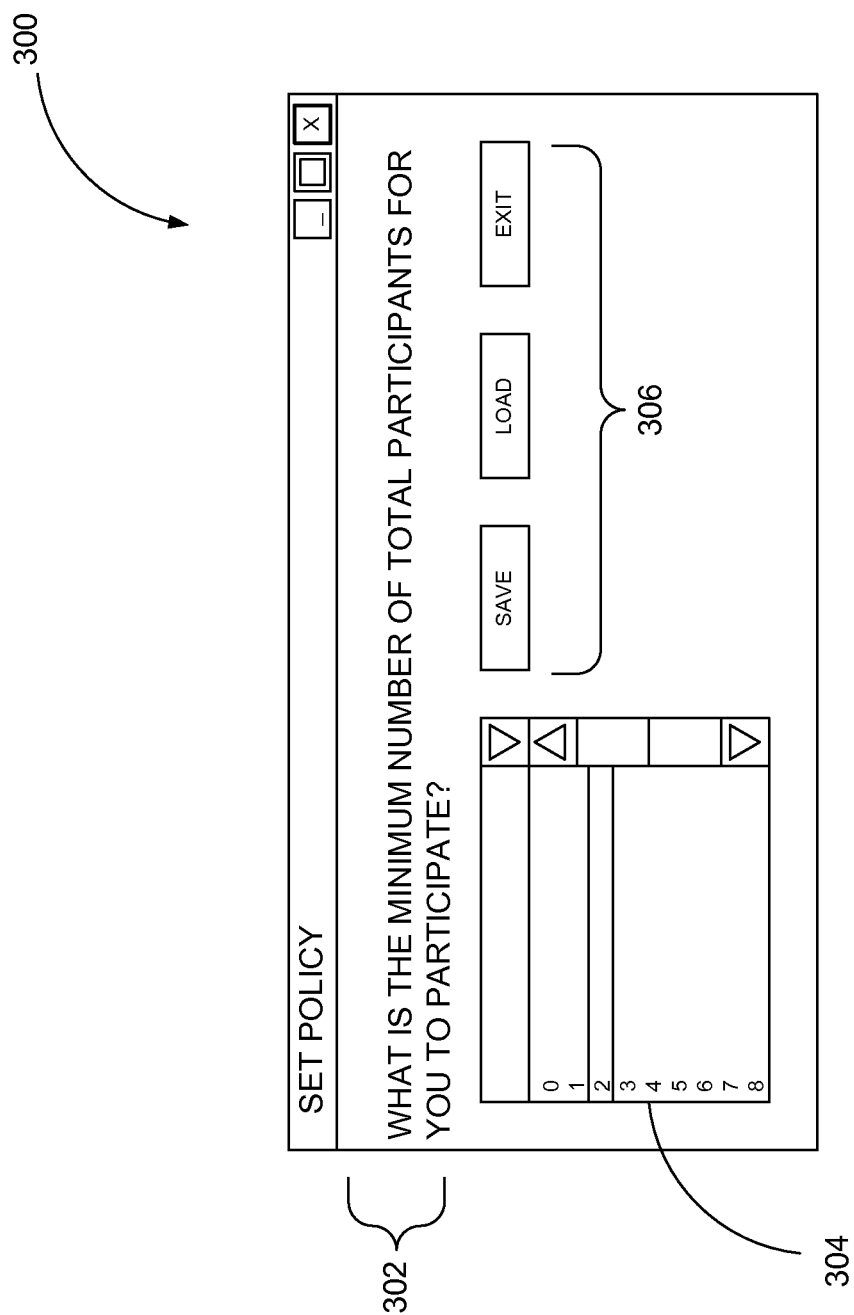
FIG. 3 is a screen diagram of an embodiment of an exemplary set policy graphics user interface (GUI) implemented in the TQN system shown in FIG. 1.

The nodes (e.g., all members) send information corresponding to their respective policies (208) to the TQN coordinator 108, which in turn determines participants for this query based on the policies (210). For instance, each participant site can set parameters (e.g., before any query processes or at any time) that manifest a willingness and/or unwillingness to participate in various queries. FIG. 3 is an example set policy graphics user interface (GUI) 300 that can be implemented through the policy configuration UI 136 (FIG. 2) (or other GUI mechanisms of a computing device associated with the participant or node). The set policy GUI 300 may be presented in the context of other screens (e.g., as an overlay on a Windows GUI), or alone in some embodiments. As shown the set policy GUI 300 comprises a question section 302 that solicits from an administrator or operator of the participant (e.g., participant 102) a minimum or threshold number of total participants needed to participate in a query. The administrator can enter through a drop-down menu 304 (or via other known entry mechanisms) the threshold quantity of participants, and complete the process enabled by the set policy GUI 300 by selecting one of the button icons 306 (e.g., save, load, exit). Note that the probe process and resultant policy release is an automated process, but in an alternative embodiment, can involve some user interaction.

The TQN coordinator 108 determines if a quorum is available from the response from the participants or members (212). If no quorum is available ("No"), the query fails, hence terminating the query (213). If a quorum exists ("Yes"), a query process is commenced. FIGS. 4A-4B are schematic diagrams that conceptually illustrate quorum processing as explained above in association with (212). As set forth above, the TQN coordinator 108 determines if a quorum of participants is present. The determination is based on inspection of each participant's policy file (e.g., policy description file 136) and the attributes defining specific release conditions is formulated, in one embodiment, as follows:

$$F = \text{MAX}(X = YI_{Y \geq T}), \text{ where } F \text{ equals the final result,}$$
$$\text{and is the maximum of all } X\text{'s (where } X \text{ is}$$
$$\text{defined as } Y \text{ where } Y \geq T).$$

$$Y = \sum_{i=1}^{n} \text{if } (T \geq P_i, 1, 0),$$

where i represents each node.

FIG. 4A illustrates a successful TQN query, wherein each node's policy (Pi) is inspected for the minimum number of respondents that each node (I) requires for it to release its data to the aggregate. In example 400a, four nodes (05, 07, 08, and 18) have policy (Pi)=0 indicating non-response. Of the sixteen other respondents, node 16 has policy (Pi)=17 (at least 17 nodes must participate). Since four nodes (05, 07, 08, and 18) have already declined to participate at all (e.g., have set policy (Pi)=0), node 16 cannot participate. The remaining fifteen nodes all have policy (Pi)<16 and therefore have an agreed-to quorum (15 or less) and will participate in the aggregate query. In sum, the number of responses equals sixteen, the number of non-responses equals four, and the final number of participants equals fifteen.

In example 400b shown in FIG. 4B, seven nodes decline to participate at all (based on non-response, i.e., policy (Pi)=0 for each). Of the remaining nodes, there is never a state where a sufficient number of nodes agree on the level of participation, and therefore, the query fails (e.g., step 213, FIG. 2) due to lack of a participant quorum. In sum, the number of responses equals thirteen, the number of non-responses equals seven, and the final number of participants is zero.

Assuming a determination that there is a sufficient number of participants whose policy permits contributing data to query Q, the TQN coordinator 108 establishes (e.g., generates) a random path or route among all nodes that agree to respond to the Q (214). Note that the path is randomly varied for each query. Also, the TQN coordinator 108 prepares an initial result, R', using randomly generated obfuscating data (216), and finalizes the TQN message for delivery (218). As shown in the "Coordinator" row of Table 1, the result R' is obfuscated by data from the TQN coordinator 108. FIG. 5 is a screen diagram of an exemplary monitor graphics user interface (GUI) 500 that can be used by an administrator or operator of the TQN coordinator 108 to monitor the policy collection by the TQN coordinator 108 (e.g., for debugging, verification, etc.). Note that the probe process and policy collection is an automated process. As shown, the monitor GUI 500 comprises the site ID 502, site service URL 504, network ID 506, policy number (e.g., threshold number of participants, etc.) 508, and an indication of whether the participant will indeed participate 510 (e.g., 0 means no participants). Information area 512 shows the final number of participants (e.g., 4) and the randomized path.

Figure 6:
FIG. 6 is a schematic diagram that illustrates an embodiment of an exemplary TQN message used in the TQN system shown in FIG. 1.

The TQN message comprising Q (the query) and R' (obfuscating data and private data) are passed among participants (220) in a completely randomized order chosen by the TQN coordinator 108 (e.g., query monitor 140). FIG. 6 is a schematic diagram of an exemplary TQN message 600. The TQN message 600 comprises in one embodiment a standard document used to pass information and record communications among nodes. In one embodiment, this message 600 is XML standard based (though not limited to XML) and comprises one or more of the following elements: original query, query metadata, such as ID, date/time, randomized traveling path, cumulated results, and count of respondents. Other information may be included in some embodiments of the message 600, and in some embodiments, fewer information may be encapsulated.

Note that the query and obfuscating data are sent to participants who have expressed a willingness to participate in the query. In some alternative embodiments, the participant may be given a choice to respond, not respond, or to delay a response. For instance, a node that delays its response, in one embodiment, can be moved to the end of the traveling path. A node which chooses not to respond can be skipped. In such alternative embodiments, a recipient node decides whether to provide its data following local policy rules (based, for example on the number of nodes that have participated in the query).

Further, although described with the TQN coordinator 108 adding obfuscating data and randomizing a path, in some alternative embodiments, the initiating participant may randomize the path and add obfuscating data, or other participants may add obfuscating data to the TQN message. For instance, a user interface may be presented to an initiator of a query (or the process pertaining to functionality of the TQN coordinator, when implemented by the initiator, may be performed automatically).

Returning to FIG. 2 and Table 1 below, a node which releases data cumulatively, adds its private data (query results) to the partial cumulative data R' (also referred to as an obfuscated result). Result R' of the query Q is accumulated throughout the circulation until every participating node has responded. For instance, from Table 1, participating nodes include responders N1, N2, N3, etc., through N6. R' returns to the TQN coordinator 108, where R is computed from R' by removing the initial obfuscating data (222). The final result R along with the original query Q is wrapped in a TQN message and broadcast to all participants who have contributed data for this query. In some embodiments, the TQN coordinator 108 may make the result or results available using other mechanisms (e.g., providing a location where the results can be accessed, etc.).

Note that any process descriptions or blocks in the flow diagram of FIG. 2 should be understood as representing modules, segments, or portions of code which include one or more executable instructions for implementing specific logical functions or steps in the process, and alternate implementations are included within the scope of the preferred embodiments in which functions may be executed out of order from that shown or discussed, including substantially concurrently or in reverse order, depending on the functionality involved, as would be understood by those reasonably skilled in the art.

Figure 7:
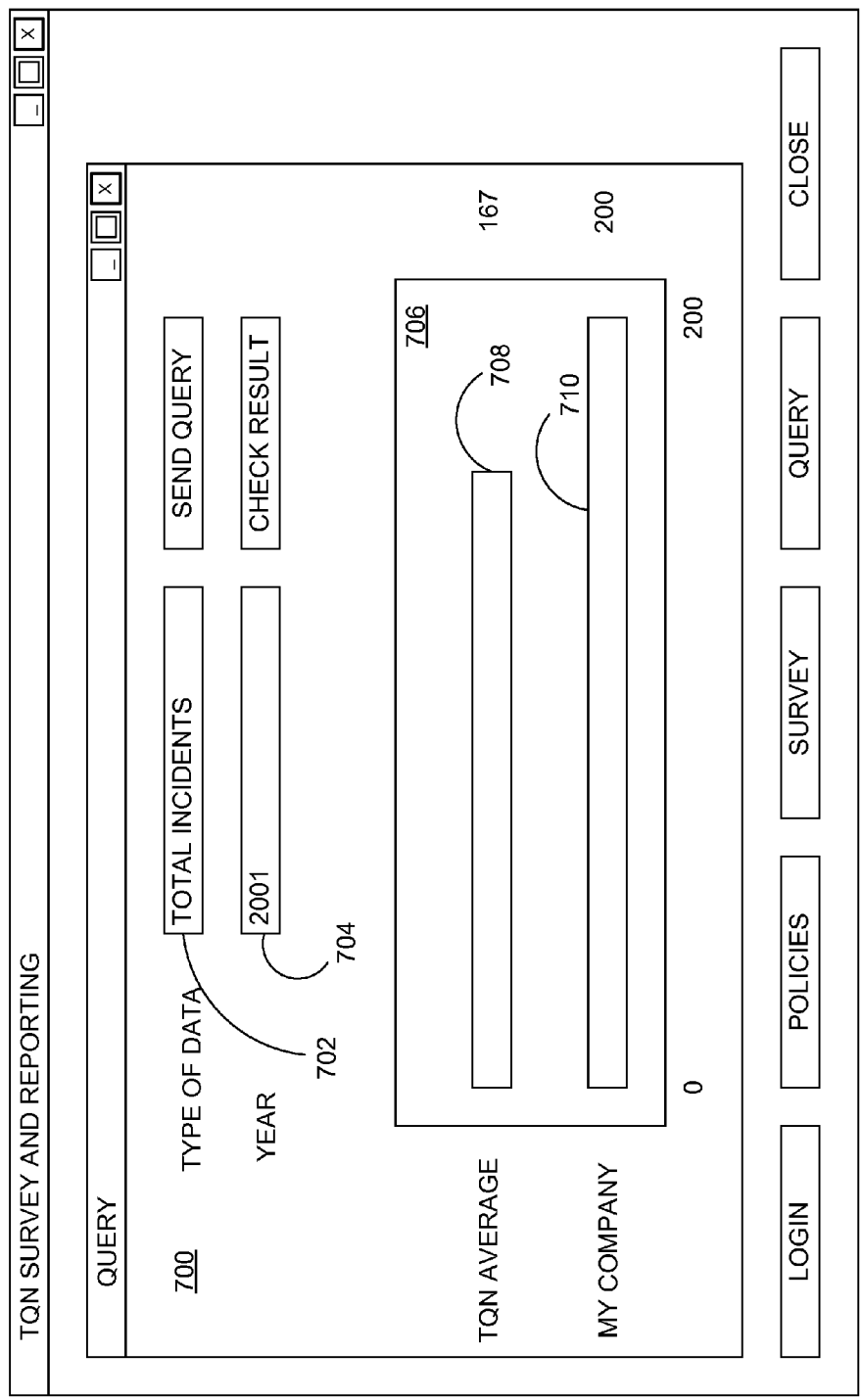
FIG. 7 is a screen diagram that illustrates one embodiment of an exemplary participant GUI generated to enable a participant to, among other functions, issue queries and view results.

The final result may be configured in different ways. For instance, FIG. 7 is a screen diagram of one exemplary result graphics user interface (GUI) 700 that includes, in one embodiment, the query 702, the period to which the query pertains 704, and a graph 706 that shows through bar symbols (although other symbols may be used) corresponding to the average 708 for the participants in total as compared to the participant in possession 710 of the current screen 700.

TABLE 1

A simple scenario: Query "Q0109884": What is total number of incident type X that occurred during the past year (see FIG. 3)?

| Nodes | Action | Result R'. Numbers in parenthesis are obfuscated data accumulated from initial query Q |
|---|---|---|
| Coordinator (after probing all nodes for participation confirmation) | Initiate query Q with obuscated data; randomize traveling path; send to the first node | Total (40) Respondents count: 5 (5) |
| $1^{st}$ responder N1 | Add data: 5 Increment Count by 1 | Total: 45 (40) //cumulative Count: 6 (5) //incremented by 1 |
| $2^{nd}$ responder N2 | Add data: 15 Increment Count by 1 | Total: 60 (40) //cumulative Count: 7 (5) //incremented by 1 |
| $3^{rd}$ responder N3 | Add data: 20 Increment Count by 1 | Total: 80 (40)//cumulative Count: 8 (5) //incremented by 1 |
| ... | ... | ... |
| Last responder N6 | Add data: 20 Increment count by 1 Send it back to coordinator | Total: 120 (40)//cumulative Count 11 (5)//cumulative |
| Coordinator: | Remove obfuscating data | Total: 80 (0) // = 120 − 40 Count: 6 (0) // = 11 − 5 |
| Final result | Broadcast to all responders N1 to N6 | Query "Q0109884": What is total number of incident type X that occurred during the past year? Answer: 15 (6 respondents) |

Figure 8:
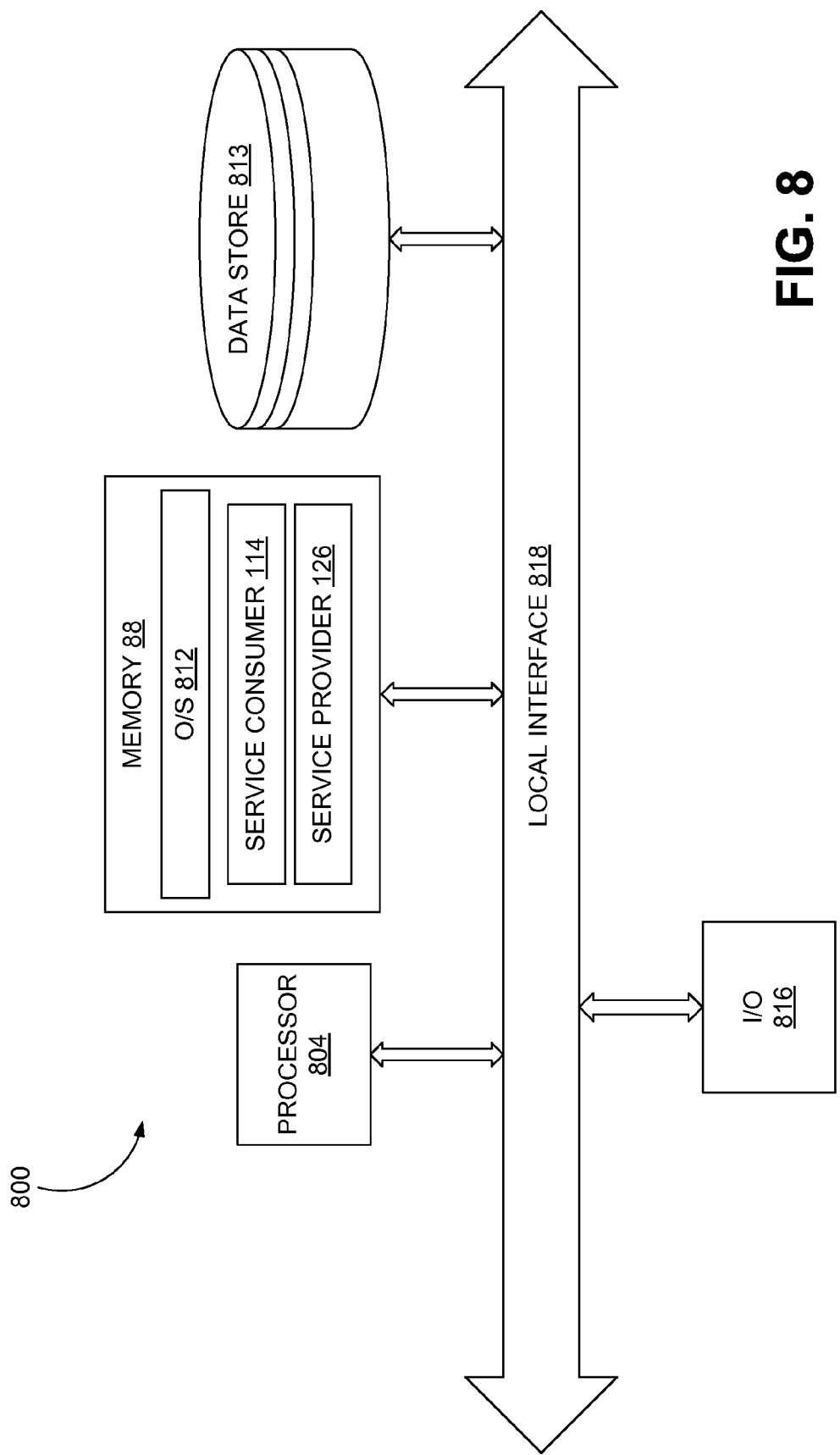
FIG. 8 is a block diagram that illustrates an embodiment of an exemplary computing device that implements functionality of service consumer and service provider in the TQN system shown in FIG. 1.

FIG. 8 is a block diagram showing a configuration of a computing device (e.g., web server, application server, computer) 800 of the TQN system 100 shown in FIG. 1. In particular, one embodiment of the computing device 800 comprises functionality of the service consumer 114 and service provider 126 (or the participant in general) shown in FIG. 1. As explained above, functionality of each may be provided in separate computer devices, or further distributed among more computing devices. One skilled in the art would appreciate that a similar architecture may be found in a computing device embodying the TQN coordinator 108. For instance, the data store 813 shown in FIG. 8 may be replaced with, or supplemented by, the registry 138, and the service consumer 114 and provider 126 may be replaced with the TQN monitor 140. Note that the data store 813 may be in addition to, or in lieu of, the local data store 130 and/or the query result repository 118 in some embodiments. Generally, in terms of hardware architecture, the computing device 800 includes a processor 804, memory 810, a data store 813, and one or more input and/or output (I/O) devices 816 (or peripherals) that are communicatively coupled via a local interface 818. The local interface 818 may be, for example, one or more buses or other wired or wireless connections. The local interface 818 may have additional elements such as controllers, buffers (caches), drivers, repeaters, and receivers, to enable communication. Further, the local interface 818 may include address, control, and/or data connections that enable appropriate communication among the aforementioned components.

The processor 804 is a hardware device for executing software, particularly that which is stored in memory 810. The processor 804 may be any custom made or commercially available processor, a central processing unit (CPU), an auxiliary processor among several processors associated with the computing device 800, a semiconductor-based microprocessor (in the form of a microchip or chip set), a macroprocessor, or generally any device for executing software instructions.

The memory 810 may include any one or combination of volatile memory elements (e.g., random access memory (RAM)) and nonvolatile memory elements (e.g., ROM, hard drive, etc.). Moreover, the memory 810 may incorporate electronic, magnetic, optical, and/or other types of storage media. Note that the memory 810 may have a distributed architecture in which where various components are situated remotely from one another but may be accessed by the processor 804.

The software in memory 810 may include one or more separate programs, each of which comprises an ordered listing of executable instructions for implementing logical functions. In the example of FIG. 8, the software in the memory 810 includes the service consumer 114 and service provider 126 according to an embodiment and a suitable operating system (O/S) 812. The operating system 812 essentially controls the execution of other computer programs, such as the service consumer logic and service provider logic, and provides scheduling, input-output control, file and data management, memory management, and communication control and related services.

The service provider 126 and the service consumer 114, as well as the TQN monitor 140 and risk analysis engine described below, are source programs, executable program (object code), script, or any other entity comprising a set of instructions to be performed. The service consumer 114 and service provider 126 can be implemented, in one embodiment, as a distributed network of modules, where one or more of the modules can be accessed by one or more applications or programs or components thereof. In some embodiments, the service consumer 114 and service provider 126 can be implemented as a single module with all of the functionality of the aforementioned modules. When the service consumer 114 and service provider 126 (and TQN monitor 140 and/or risk analysis engine) are source programs, then the programs are translated via a compiler, assembler, interpreter, or the like, which may or may not be included within the memory 810, so as to operate properly in connection with the O/S 812. Furthermore, the service consumer 114 and service provider 126 (and TQN monitor 140 and risk analysis engine) can be written with (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The I/O devices 816 may include input devices such as, for example, a keyboard, mouse, scanner, microphone, multimedia device, database, application client, and/or the media storage device, among others. Furthermore, the I/O devices 816 may also include output devices such as, for example, a printer, display, etc. Finally, the I/O devices 816 may further include devices that communicate both inputs and outputs such as, for instance, a modulator/demodulator (modem for accessing another device, system, or network), a radio frequency (RF) or other transceiver, a telephonic interface, a bridge, a router, etc.

When the computing device 800 is in operation, the processor 804 is configured to execute software stored within the memory 810, to communicate data to and from the memory 810, and to generally control operations of the computing device 800 pursuant to the software. The service consumer logic and service provider logic and the O/S 812, in whole or in part, but typically the latter, are read by the processor 804, perhaps buffered within the processor 804, and then executed.

When the service consumer 114, service provider 126, TQN monitor 140, and/or risk analysis engine are implemented in software, some of which is shown in FIG. 8, it should be noted that the service consumer 114, service provider 126, TQN monitor 140, and/or risk analysis engine can be stored on any computer-readable medium for use by or in connection with any computer-related system or method. In the context of this document, a computer-readable medium is an electronic, magnetic, optical, or other physical device or means that can contain or store a computer program for use by or in connection with a computer related system or method. The service consumer 114, service provider 126, TQN monitor 140, and/or risk analysis engine can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

The service consumer 114, service provider 126, TQN monitor 140, and/or risk analysis engine, which each comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In addition, the scope of an embodiment includes embodying the functionality of the preferred embodiments in logic embodied in hardware or software-configured mediums.

Various solutions to capturing basic information on security data rely on some form of survey instrument (herein, also survey tool). A survey tool may be implemented by various embodiments of the TQN system 100 in the form of one or more graphics user interfaces (GUIs) that provide cumulative feedback and analysis of user input. For instance, the survey tool can be embodied in the computing device 800 in some embodiments, or as a standalone device or computing device that interacts with the TQN system 100. The survey tool helps users to focus on their replies in an overall context, and provide a running, cumulative summary of their replies that can improve the user experience and data quality. For instance, the user tool is designed to help users input data quickly, accurately, and easily. Those people who will be using the survey tool may not be the ideal person for the job, but the survey tool guides them through the process and helps insure that quality data is obtained.

As many respondents do not normally view filling out surveys with much enthusiasm, the GUIs described below in association with FIGS. 9-14 are designed to capture as much data as possible with the least amount of time and effort by the users. In one embodiment, the survey tool is manifested as five screens or GUIs (and the associated software and/or hardware functionality, such as residing in the computing device 800 or other devices integrated in the TQN system 100, or as an adjunct to the TQN system 100 in some embodiments) of questions, though fewer or more or different GUIs may be used in some embodiments. Throughout the survey process, the user is asked to expand on previous answers and sometimes parts of a section depend on the answer given elsewhere. Anywhere it is possible, the survey tool fills in answers to questions that are linked. For example, after the user provides the total number of incidents in their company, they are asked to split the incidents into three categories. After entering the number of incidents in the first two categories, the corresponding survey tool software, for instance, calculates and enters the numbers for the third, allowing users not to worry about addition and subtraction but concentrate on the answers they are giving. The process embodied by the survey tool helps with the other goals of the data collection process.

Note that the TQN system 100 enables decision-making based on accurate data in areas where organizations are reluctant to disclose their information. Therefore, at least one goal of the survey tool is to obtain information that will be usable for analysis. Some of the features of the survey tool that help to increase data quality are the ability to fill in known quantities and the graphical display of information. The auto-filling in of blanks described above is also useful in that the data is more accurate (e.g., avoiding the entry of obviously incorrect data). As the software calculates the missing numbers, users will see if the answers given earlier make sense given the result of the calculation. The survey tool also bases later questions and scales on previous answers, which allows the users to double check earlier answers when seeing them in later questions.

Another feature helpful to ensuring accuracy is the use of graphical displays that interactively show the users their answers. These displays illustrated in FIGS. 9-14 allow users to view the answers and visually compare with the other answers they have given, acting as a check on their initial responses, and giving them another chance to modify answers that may not be correct.

The survey tool is developed to collect important information for all organizations involved in the TQN system 100, as well as others through the research enabled by the data collected. However, the people entering the data may not be as motivated or trained as would be desired. The survey tool has therefore been designed to be easy to use and not intimidating. Once again, the survey tool's ability to fill in answers that can be calculated from previous answers is important, helping the users and allowing them to concentrate on their answers, not the addition or subtraction needed to match their answers. The survey tool can also help to identify and flag potential consistency errors if a calculated answer is far off from what the user expects.

The survey tool also lets the user pop-up a window with definitions if they forget what some of the terms used are trying to convey. By allowing the users access to these definitions when needed, they can always seek help if they are lost. In addition, the survey tool uses a familiar windows interface that should be familiar to most users, as well as combination boxes that allow users to pick from valid answers. All of these features ensure the users are ale to enter data quickly, accurately, and easily.

Explaining further, the survey tool is designed to capture the information needed to answer questions suggested as typical IT security risk research topics for which appropriate metadata is needed. These questions include the following: (1) Can the risk of loss by incident type be accurately estimated? (2) How accurate do these estimates need to be to help companies? Researchers? (3) Are funds allocated to security expenses based on dollar losses by type of incident? If X % of losses are from viruses and the business spends Y % of its security budget on virus protection what is the function that determines x and y? (4) Can the TQN system 100 accurately gather total information security expenditure information from firms? (This information should be in theoretically meaningful subcategories such as follows: (a) What is your total security budget? (Use similar scale as losses), (b) What are the categories of expenditures that will make sense to the participating organizations? (A distinction between physical and information security needs to be clearly defined.)) (5) Are firms getting value added from their security investments? (This is testing the path between security costs and total dollar losses by year: (a) By industry, (b) By size, and (c) By country) (6) Would benchmarking of security costs/losses by incident type, by industry (NAICS codes) etc., be useful for firm level risk assessment? What is the overall social impact? (7) Can the TQN system 100 gather representative data to be determined by comparison of distribution of NAICS codes in our system with the economic census' distribution? (8) Is there a relationship between security countermeasures and risk? (9) Does this vary by category of threat? (10) Is there a relationship between security countermeasures and losses across threat categories? Or within specific threat categories? (11) What are the relevant security countermeasures that map to threat categories?

The survey tool gathers demographic data about the companies themselves, like their size and industry. The companies are then asked to supply information about the incidents they have had in various categories and the costs associated with those incidents. These questions supply the data needed to answer the research questions above.

Having provided a background of the survey tool, the following GUIs provide an overview of the survey tool to be used in, or in cooperation with, the TQN system 100. FIG. 9 is a screen diagram that illustrates an exemplary demographic graphics user interface (GUI) 900, in which users can enter information about themselves and their company profile that may be used by the TQN system 100 for both determining query participation and statistical analysis. For instance, regions of the demographic GUI 900 include size of the organization in revenue 902, assets 904, and employees 906. Additional regions of the demographic GUI 900 include information about the type of organization 908, as well as information about the responder such as general experience 910 and risk management/information security experience 912.

FIG. 10 is a screen diagram that illustrates an exemplary incidents graphics user interface (GUI) 1000, in which users can enter information about both accidental and deliberate attacks in the IT infrastructure. For instance, regions of the incidents GUI 1000 include questions pertaining to number of incidents for a given period 1002 and category of each 1004, types of incidents 1006, and method of attack 1008. After entering data for one question, the next question is enabled and percentages are automatically calculated. Also, the incidents GUI 1000 checks to make sure the answers are within the bounds of previous answers.

The incidents GUI 1000 (as well as other screens in some embodiments, though not explicitly shown) also includes a definition button icon 1010, which when selected, presents a definitions screen 1100 shown in FIG. 11. The definitions screen 1100 enables a user to observe definitions of terms shown in one or more GUIs to help ensure consistency in term usage and understanding.

Figure 12:

Another screen diagram is shown in FIG. 12, referred to herein as a physical and falsification cost details graphics user interface (GUI) 1200. The physical and falsification cost details GUI 1200 solicits answers to the most expensive incident in two categories and sets up a range above respective graphs. Previous answers limit the range of the data accepted and the last number is based on previous answers. Hence, the physical and falsification cost details GU 1200 includes regions for responding to questions pertaining to the cost of the most expensive physical incident 1202, the range of costs and the number for each 1204 (accompanied in one embodiment by graphics), the cost of the most expensive falsification incident 1206, and the range of costs and the number for each 1208 (accompanied in one embodiment by graphics).

FIG. 13 is a screen diagram of an exemplary malicious and hacking incident graphics user interface (GUI) 1300. Similar to the physical and falsification cost details graphics user interface (GUI) 1200, malicious and hacking types of incidents are calculated, recorded, and presented in a similar format to that shown in FIG. 12, and hence further description is omitted for purposes of brevity.

Figure 14:

FIG. 14 is a screen diagram of an exemplary critical infrastructure/terrorism and total cost graphics user interface (GUI) 1400, with a similar arrangement as GUIs 1200 and 1200 shown in FIGS. 12 and 13, respectively, and hence description of similar components are omitted here for brevity. This GUI 1400 requests information about critical infrastructure and terrorism related incidents. In addition, the respondent is asked about the total cost of known incidents and also about any suspected incidents that may have occurred.

Having described various GUIs that may be presented to an organization to collect survey information on IT risk management, a discussion of additional embodiments follows that pertain to the incorporation of a possibility risk analysis engine (herein, also referred to simply as a risk analysis engine) in the TQN system 100, or in some embodiments, as an adjunct component to (in communication with) the TQN system 100. Before proceeding to a discussion of embodiments of a possibility risk analysis engine, a brief discussion of various risk analysis methods follows.

The data collected and shared in the TQN system is sensitive and confidential, but needs to be aggregated and shared with the other participants. The aggregation of the information should allow individual organizations to maintain confidentiality while still contributing their data. One embodiment of the TQN system 100 implements sum, count and average functions that hide an individual's response in the average of a group. In addition, the min, max, and standard deviation are implementable and other aggregation functions like those found in SQL or Excel appear to be feasible as well. However, a question is posed as to the feasibility of other aggregation mechanisms. For instance, can information systems security be achieved best through discrete safeguards adoption decisions? Consider the equation below:

$$R = P \times L$$

In the equation above, risk is calculated from P that represents the annualized probability of an event that will cause a financial loss L. For example, if an insider fraud occurs, on average, every ten years and costs, on average, $100,000, then annualized probability is 0.1 and the annualized risk is $10,000. This annual benefit of operating a safeguard against this event can be used to justify the expense of investing in and operating the safeguard.

This simple arithmetic becomes exceedingly complex because of the interwoven nature of the wide variety of threats, the wide variety of safeguards, and the variance of levels of probability and loss that are unique to every organization. Threats and safeguards are overlapping. As a consequence, a database of threats, probabilities, potential losses, and potential safeguards can be complex enough, but the compilation of an analysis of all of these interwoven elements compounds this complexity. Not surprisingly, computer-based analysis tools have been developed for collecting and analyzing these factors. One well-known tool is the CRAMM risk assessment and management method.

Cost-benefit forecasting involves the financial concept of risk. In this perspective, risk is a measure of the degree of variability of the outcomes over time. High financial risk means that the outcomes may seem very high or very low depending on differing time frames. Low financial risk means that the outcomes will seem nearly the same at all times. This financial concept distinguishes between risk, probability and uncertainty.

Probability regards the relative possibility that any one event will occur in comparison with other events. Another way to express this is the relative frequency of one event compared with other events. For example, if a particular disk drive typically fails once every 20 years, the probability of a disk drive failure this year would be 0.05.

Uncertainty is the error-induced variation of the estimate from the actual. Uncertainty regards the faith in one's guesswork. For example, with what certainty does one estimate that disk drives fail once every 20 years? If this fact is based on a poor sample or widely varying data, it might represent a "bad guess" with high uncertainty.

Risk properly regards the random variation of the estimate from the actual. Even though one may be very certain in the measure of a 0.05 disk failure probability, providence (e.g., in the form of sheer bad luck) may give a disk unit that fails each and every year for 20 years in a row. The interaction of uncertainty and probability give rise to more sophisticated techniques for making statistical estimates in financial forecasting. For example, the well-known Bayes theorem addresses the statistical "revision" of prior probabilities yielding posterior probabilities. It arises in decision theory when imperfect information is added to a decision situation. In risk assessment, improvements in the quantitative validity (e.g., considering probability of riots $P(S_1)$ and the probability of no riots $P(S_2)$) may be related to additional data (e.g., the political stability of a regime). This requires the intersection of probabilities (viz., the probability of riot and the probability of a politically stable regime). The model regards the possibility that any information (e.g., "the regime is politically stable") could be incorrect (hence, additional data about the state of nature is probabilistic).

Assessment involves the general probability of having the prediction and, importantly, the probability of error (e.g., false or misleading information). There is also the plain misfortune (risk) of becoming the unhappy member of a statistical minority regardless of the information.

More fundamentally, this rational economics approach to the safeguards adoption decision is complicated by a number of intractable problems. Two of these are both important and interlocking in this decision setting: the lack of useful statistical data, and the dominating presence of products in driving security thought leadership. For instance, an important issue is the lack of useful statistical data about the economic losses that ensue from information security compromises. There are several factors that drive this problem. First, firms are constrained from unnecessarily revealing losses that arise from computer compromises because public release of such information may undermine public confidence in the firm itself. A large loss or embarrassing disclosure of private data that arises from a security oversight gives the appearance of managerial incompetence. There is good evidence that the loss of public confidence in the firm is not a necessary consequence of every major compromise, but it appears to be a consequence in certain circumstances. As a result, many authorities believe that any data that could be collected would represent a misleading understatement of the losses.

A second factor complicating statistical data reporting about losses is that much of this data is simply unavailable. In many cases, firms may not even know the exact degree of the economic impact of such a compromise. Disaster recovery is necessarily unstructured, unplanned and often chaotic. Pre-planning cost tracking methods for an unforeseen loss is difficult. Not only would there be costs associated with tracking these losses, but the management of this cost tracking would distract resources away from the recovery itself. As a result, cost accounting during this recovery process may be unintentionally or intentionally omitted by management.

A third factor complicating this statistical data reporting is the rare or unique nature of certain kinds of losses, such as fraudulent acts by employees. Such acts are often carefully planned to avoid similarity with previously known frauds. Unlike traditional threats, those against which security technologies are arrayed, certain events are non-random in nature, and such data lack sufficient frequency amplitude to permit significant generality across different organizations and different industries.

Heuristics and tools for aiding the decision-maker in evaluating risk are widely varied in financial risk forecasting. Most still operate from underlying probabilistic assumptions. For example, simple elements of Bayesian statistics for decision-taking can, in the presence of uncertainty, become heuristic, such as maximin, maximax and Laplace rules, which have to do with the maximization or minimization of uncertainty and risk.

Another tool is a probability tree. Similar to a decision tree, the tree reveals various options, probabilities and the probable outcomes, analyzed regarding the alternative purchase of two assets. Each asset is analyzed in terms of the likelihood for low, moderate or high traffic and the consequent investment return for each asset in each condition. This gives the decision-maker an overview of the risk profile in each option.

Utility theory regards the interaction between the nature of the decision maker and the nature of the risk. Financial risk forecasting also takes into account the wide variations in the decision maker's willingness to accept risk. Risk averseness regards individual sensitivity to risk. Risk-averse managers are unwilling to tolerate large degrees of risk, and will tend toward the "safest" possible courses of action. Risk tolerance is the same idea from the opposite perspective. Risk-tolerant managers are willing to take high-risk courses of action. Risk tolerance is related to outcomes in which high rewards are possible. Risk averseness will often dominate when survival (individual or organizational) becomes an issue. Risk tolerance will often dominate when the possible losses are low. Risk utility curves are sometimes used to represent risk averse behavior by relating outcomes and risk probabilities. Decision makers can position their decision on this curve according to their risk tolerance given the possible outcomes.

Another issue is in regard to the interaction between the risks when holistically viewed as a group of risks. One technique commonly used by risk averse managers to manage high-risk situations is called the portfolio approach to risk. This approach develops a set of assets (the portfolio), which are forecasted to exhibit opposing trends in risk. This technique, called diversification of a portfolio, establishes opposing relationship between the patterns of asset behavior. For example, cash flows from a pair of diversified assets might vary inversely over time, for instance revealing asset returns that have opposing cycles of profit and loss periods. By holding both assets, a constant net profit curve results.

Few computer-based risk assessment packages have overlooked the issue that, in some cases, high risks may be acceptable in certain areas if there are offsetting lowered risks in other areas. Most will model portfolio risk and calculate the interaction of rising and falling risks within a portfolio.

The portfolio concept was a primary aspect of the known McFarlan approach to risky IS development decisions, which recommended risk-based management of a "portfolio" of information systems development projects as one decision heuristic in determining IS project feasibility. McFarlan uses a 54-item risk assessment questionnaire to qualitatively characterize the risk profile of an organizational information systems function. Elements of project risk include project size, the experience of the developers with the technology, and the nature of the project structure. Each of these elements is somewhat relative to the context of the organization (what is low-tech to one firm may be high-tech to another). Once the nature of a project's risk has been determined, then a number of factors are highlighted that can be used to help determine if high-risk projects should be undertaken.

Fuzzy variables and set theory provide a useful moderation of the quantitative-qualitative issue, but primarily represent acceptance of a large amount of data. This enables software packages to capture fuzzy data from system experts and model the impact using fuzzy sets. A simple example of how this issue occurs in risk assessment is found in an early, experimental security evaluation tool known as Securate. This tool is a computer installation security evaluation and assessment system implemented in APL and tested at a number of commercial sites. Securate incorporates "triplets" that are composed of 1) a set of objects (installation resources to be protected, 2) a set of threats (intruder activities), and 3) a set of security features (protective measures). The program dealt with the problem of imprecision in measurement of risk, value, and loss by using fuzzy sets of linguistic variables. Using Securate, analysts characterize security elements with linguistic variables from a preset vocabulary of values (such as "high" or "low") and modifiers (such as "somewhat" and "more or less"). Compatibility functions convert the linguistic values to a base scale (a probability curve). Each modifier is implemented as a function that receives the values and returns a geometric or linear modification of the values. Using this scheme, Securate calculates output ratings for security elements. These ratings are communicated to the analysts in terms of the linguistic values and modifiers of the input language. For example, the risk in the operating system subsection might be rated "More or less Medium."

The use of fuzzy set theory has inevitably led to a fundamental rift in fundamental risk assessment thinking. Almost all risk assessment is founded on probability theory. The alternative is "possibility theory." Probability theory induces one to believe that one cannot totally rule out all probabilities of an intrusion. Persistent, well-supported, and highly professional intrusion attacks have a higher probability of success. Alternatively, possibility theory places defenders in a theoretical framework more suitable for high-stakes protection in settings of information warfare and national infrastructure protection.

Possibility function geometry reveals that any security measure operating during an unrestricted time interval ultimately produces a possibility of compromise that approaches absolute certainty. A practical countermeasure in this situation involves defining a fixed interval of time, and the evaluation of all protection measures only during this interval. Thus, risk assessment centers on a "protection interval" and procedures that verify the information resource integrity to insure no compromise has occurred during the protection interval. The Pi is then restarted with a new time interval having a zero possibility of compromise.

As a consequence, other models for managing non-random risks are explored, especially those that involve innovative human intent. As these risks are directed in ways meant to be surprising, the threat setting presents more or less information about the degree of the threat and the need for managing the threat. An alternative basis for decisions shifts to foundations in possibility theory. Possibility theory is promising in this setting because it is a framework that operates with non-random events on the basis of the relationship between evidence and uncertainty. Evidence theory involves the full or partial resolution of uncertainty through decisions about information available concerning the non-random event. Possibility theory suggests that risk management decisions can be staged: decisions are first made about the degree of evidence that an event may arise and second about the likelihood that this event will arise.

This point can be illustrated using an example from possibility theory, namely the alpha cut. The alpha cut, and possibility theory, represents the point in which a decision is made to include an event from a fuzzy set as an element in a crisp set. For example, assume a situation where there is concern about providing security to prevent any of ten (10) accountants from defrauding the company. Assume that it is possible to easily obtain simple credit checks for each of the ten accountants, and that there is a belief that this evidence will provide indications about the likelihood that any one of the ten accountants will consider committing fraud. Suppose the credit check reveals that five accountants have AAA credit ratings, two have AA ratings, one has A rating, and two have B ratings. There is now a fuzzy set of potentially fraudulent accountants. The fuzzy sets arise when membership in the set is ill defined. For example the two accountants with B credit ratings are more clearly members of this fuzzy set than the five accountants with AAA ratings.

But it is not clear whether the other three accountants are members of this set. The concept of the alpha cut refers to the conversion of this fuzzy set to a crisp set by deciding a firm point on which membership is defined. Assume that the alpha cut will be set at an A rating, meaning that seven accountants are excluded from the crisp set, and three accountants, those with an A rating or worse will be considered members of the set of potentially fraudulent accountants. By separating the decision about the criteria for inclusion of members of a fuzzy set as members of a derived crisp set, an alpha cut is exercised. The alpha cut in this case is set at an A rating or worse.

There are two fuzzy measures that can be associated with the alpha-cut. First, a degree of belief can be assigned based on the available evidence, that these three accountants belong in the crisp set of possible fraudsters. Similarly, the degree of belief about the exclusion of the other seven can be considered. For example, suppose a high confidence, say 75% confident, that these three accountants all belong in the crisp set. If this confidence is treated as a degree of belief, it suggests a 25% (or less) confidence that the three do not all belong in the crisp set (e.g., assume the confidence that the accountants either are, or are not, in the crisp set will add up to 100% or less). Suppose for example, the degree of belief is 75% confident that the three are in the crisp set, and only 10% confident that they don't belong in the crisp set.

Additionally, a degree of plausibility can be assigned that these three accountants belong in the crisp set of possible fraudsters. Plausibility is the inverse of the confidence that these three don't belong. Following the 10% degree of belief they don't belong, the plausibility of their assignment is 90%. In certain cases the evidence can be "nested." In this example, in terms of poor credit ratings, B credit ratings can be nested inside A credit ratings as in "A rating or worse". When this happens, it is possible to convert belief to necessity, and plausibility to possibility. Necessity is a fuzzy measure, which is functionally related to belief evidence that involves nested subsets. Possibility is a fuzzy measure, which is functionally related to plausibility evidence that involves nested subsets.

Having provided a background to possibility theory, discussion can proceed to embodiments of a risk analysis engine that incorporates possibility theory. Note that, though described in the context of possibility theory, some embodiments of risk analysis engines may use probability theory, possibility theory, or a combination of both. A possibility risk analysis engine may be embodied in the TQN coordinator 108, in a computing device of a participant (e.g., integrated with or used in conjunction with the service consumer 114 and/or service provider 126), or in a remote computing device that communicates with each of these entities over the network 110. Development of a possibility risk analysis engine based on possibility theory begins with the adaptation of this mathematical theory of evidence for the purposes of gathering data, analyzing the data, and representing the results within the context of information security risk analysis. As set forth above, possibility theory is based on the relationship between evidence and uncertainty, and separates decisions about quality and uncertainty of the evidence from the decisions about the uncertainty of the phenomenon being represented by the evidence. This framework is effective for studying nonrandom events and considerably better for situations with improbable but possible events.

As with other forms of fuzzy sets, possibility theory operates with opinions, ranges, and subjective information rather than operating with point estimates (such as is common with probability-based arithmetic). Thus, data should be able to be collected from multiple experts and the analysis should provide a mechanism of comparing and contrasting the estimates and opinions of these experts. A further result of possibility theory implementations is that the analysis should take into account estimates and opinions of experts on several different kinds of evidence relating to a particular risk or threat.

Collecting data from multiple experts, on multiple points of evidence, each of which may involve a range of opinion and confidence, should use fuzzy set arithmetic to analyze and compound the available evidence. In one implementation, an analysis engine uses simple additive analysis of this evidence. Fuzzy set addition is usually represented as the union of two fuzzy sets. As is known, fuzzy set union refers to taking the maximum value at every point. An embodiment of the risk analysis engine uses fuzzy sums to represent the sum of opinions about particular risks.

To demonstrate the operation of embodiments of a risk analysis engine, one example implementation involves the risk of a data spill. A data spill occurs when organization loses sensitive records to an intruder or to an innocent receiver as a result of an accident. There have been many disastrous data spills that have become publicized over the past years. These are serious events. In order to estimate the risk of the data spill in any organization, evidence about this risk should be collected and analyzed. Given that frequency data that is correlated with impact is unavailable, fuzzy evidence collected from experts concerning the risk of the data spill in a particular organization can be used. For exemplary purposes, four different categories of evidence can be used.

Evidence that might indicate the likelihood of a data spill in a particular organization could include (1) the quality of encryption of the backup media, (2) the quality of protection for systems, (3) the effectiveness of security procedures, and (4) the degree to which the security procedures are followed. To gather opinion data about these four kinds of evidence, experts can be asked the following four questions: (1). What is the risk of the backup media will be compromised? (2) What is the threat for breaching these systems? (3) What is the risk that security procedures are ineffective? (4) What is the risk that security procedures will not be followed?

Figure 15:
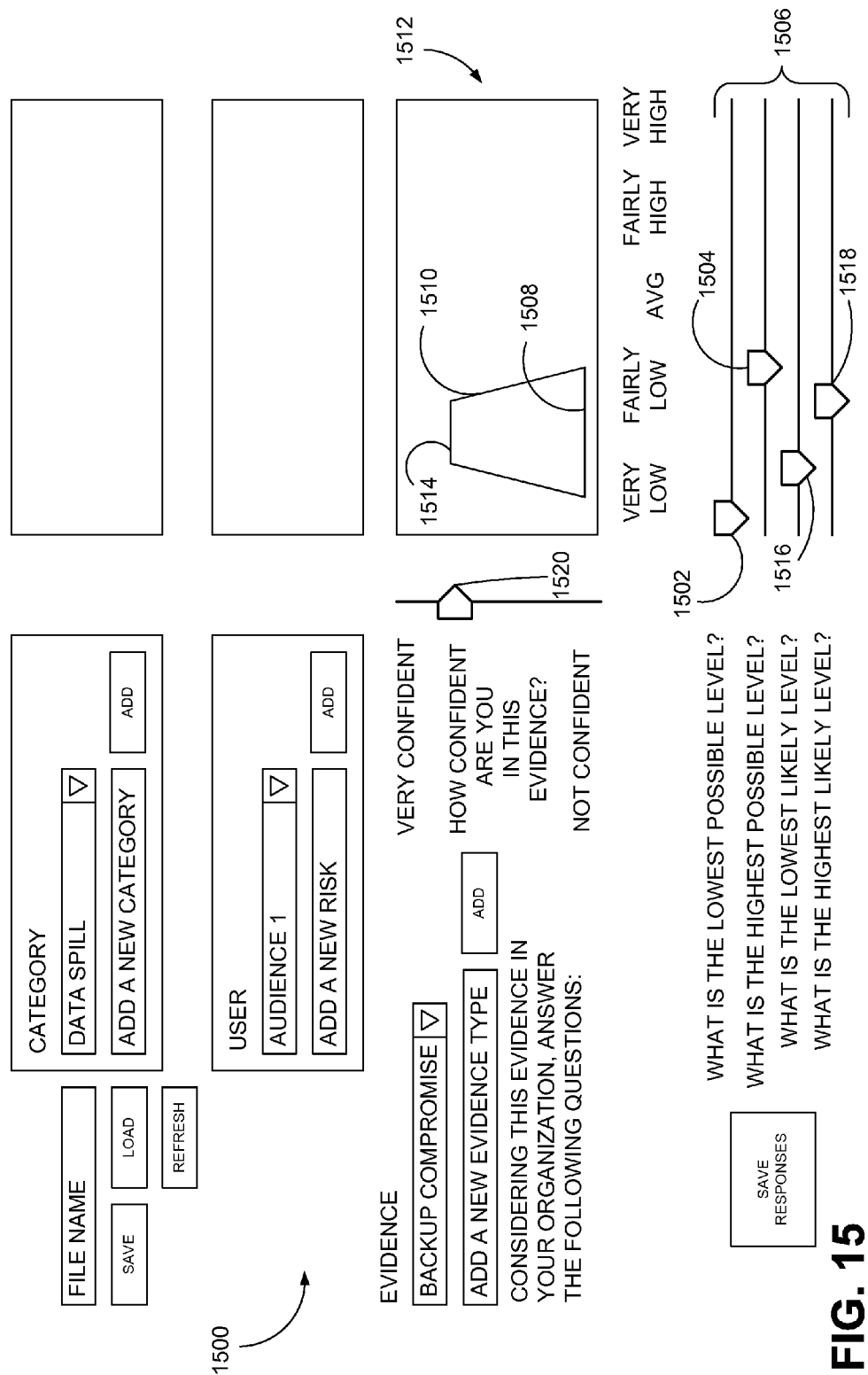
FIGS. 15-18 are screen diagrams that illustrate an embodiment of various GUIs used to enable interaction between a user and a risk analysis engine in the TQN system shown in FIG. 1.

An embodiment of a possibility risk analysis engine collects data from each expert on these four elements of evidence in the following way. Each expert is presented with a GUI, and asked to enter their opinion on each element of evidence by adjusting five slider bars (or other interface mechanisms) to represent the lowest and the highest possible levels, the lowest and the highest likely level, and the degree of their confidence in the value of their evidence. One embodiment of a screen or GUI representing the interaction of the user with an embodiment of a risk analysis engine in answering question (1) above is shown in an exemplary risk analysis graphics user interface (GUI) 1500 illustrated in FIG. 15. In this case, as shown by the slider bars 1502, 1504 in region 1506, the expert has entered an opinion that the lowest possible level is very low and the highest possible level is fairly low. These responses are also represented in the bottom line 1508 of the trapezoid 1510 in region 1512, and corresponds to the two slider bars 1502, 1504 for "possible" levels.

The expert has also estimated their opinion that the lowest likely level is slightly higher than very low, and the highest likely level is slightly lower than fairly low. This is represented by the top line 1514 in the trapezoid 1510, and by the two bottom sliders 1516, 1518 in FIG. 15. Finally this expert has set their degree of confidence in this evidence to be very confident represented by the slider 1520 to the left of the trapezoid 1510, and also represented by the height of the trapezoid itself.

Figure 16:
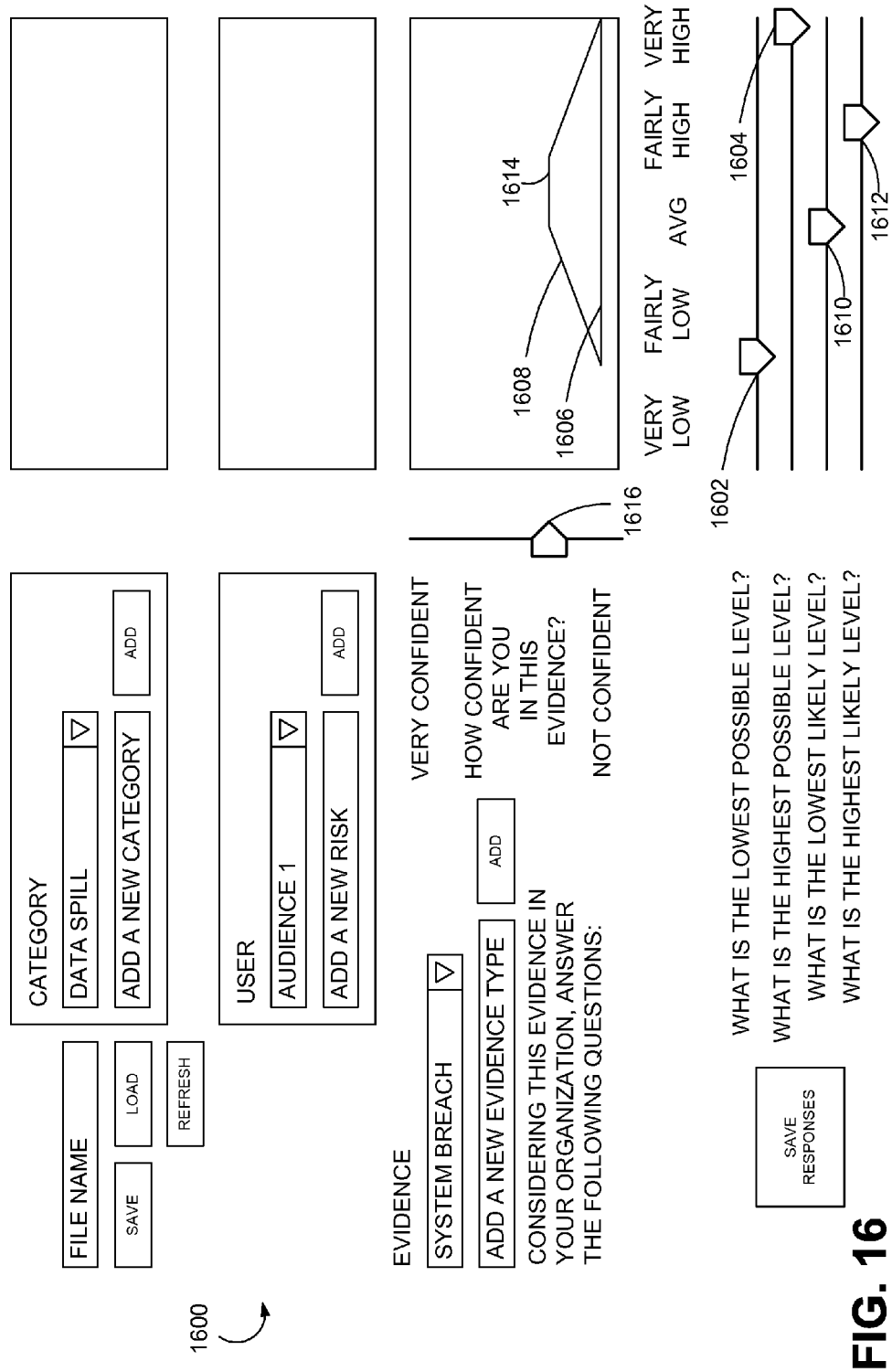

FIG. 16 is a screen diagram of an exemplary risk analysis graphics user interface (GUI) 1600 that represents the entry of a second element of evidence by the same expert. The GUI 1600 represents the response to the second question, "What is the threat for breaching these systems? This expert has responded with a belief that the lowest possible level is slightly lower than fairly low while the highest possible level is slightly lower than very high. This entry is represented by the top two slider bars 1602, 1604 in the figure for lowest and highest possible level respectively, and is represented by the bottom line 1606 in the trapezoid 1608. The expert has also estimated that a lowest likely level is slightly lower than average and the highest likely level slightly lower than fairly high. This entry is made using the bottom two sliders 1610, 1612 in the GUI 1600, and is represented by the top line 1614 in the trapezoid 1608. With regard to this evidence, this expert has expressed a fairly low degree of confidence by setting the confidence slider 1616 in the bottom third of its range. This is represented by the height of the trapezoid (which is rather short).

Figure 17:
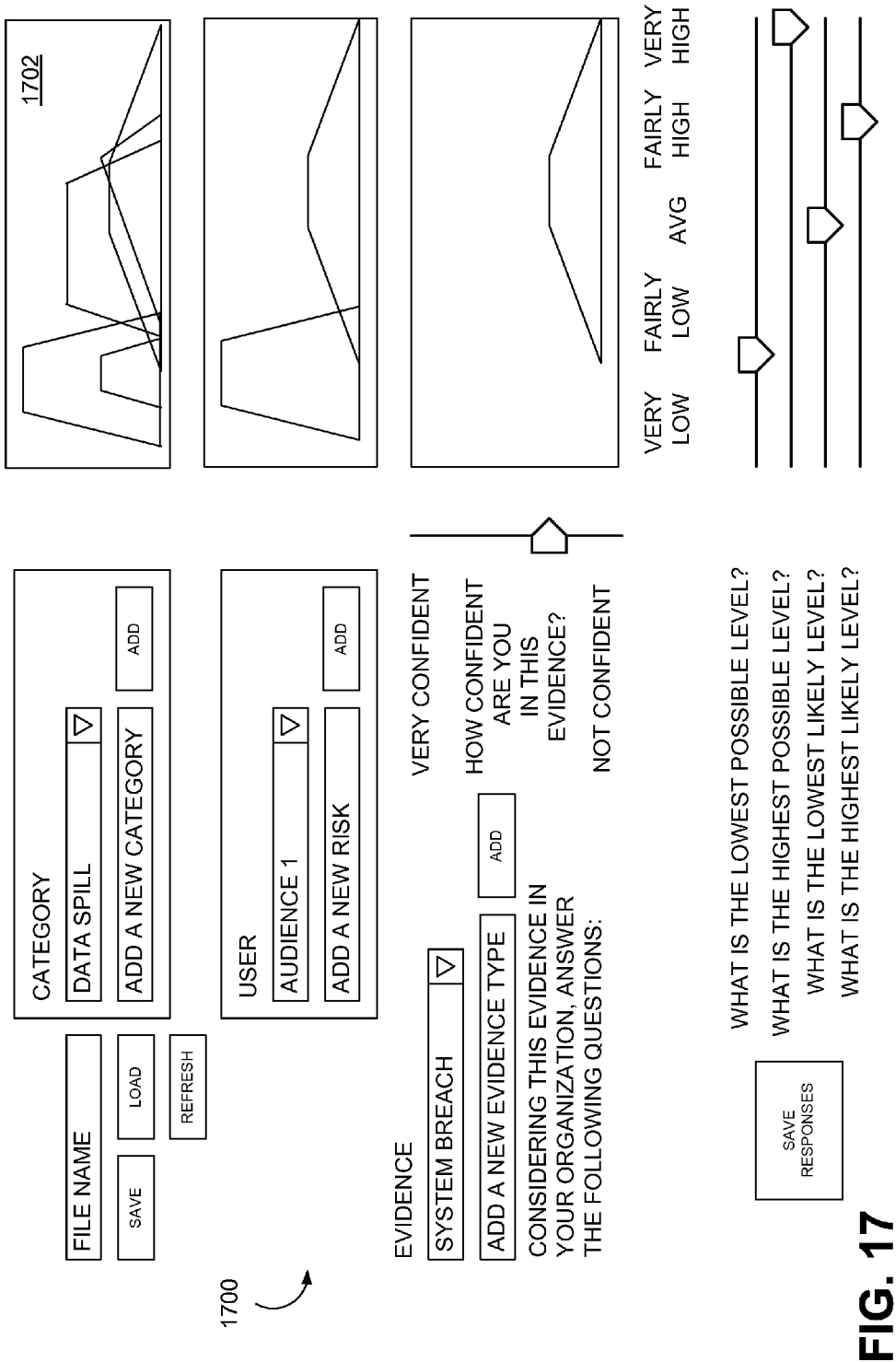

As the evidence is entered, an embodiment of a risk analysis engine accumulates an analysis by providing a representation of the compound opinions of multiple elements of evidence by multiple experts. This analysis appears on the exemplary risk analysis graphics user interface (GUI) 1700 illustrated in FIG. 17. The expert currently working the system is represented by distinguishable trapezoids (e.g., of a different color than others, or other distinguishing features) in the center display. It is noted in a top display 1702 that a previous expert has already entered opinions in an earlier evidence session. This previous expert is represented by a distinguishing trapezoid in the top display 1702. The top display 1702 also includes the evidence that has just been entered by the current expert. This overlapping display in 1702 enables analysis of the different forms of evidence offered by different experts. This enables the analyst to separate confidence (uncertainty) about the evidence from uncertainty about the event itself. For example, the analyst can make decisions about the uncertainty in the evidence from expert number one (e.g., in one color, such as red) in comparison with a higher degree of certainty in those cases from expert number two (in another color, such as blue).

Figure 18:
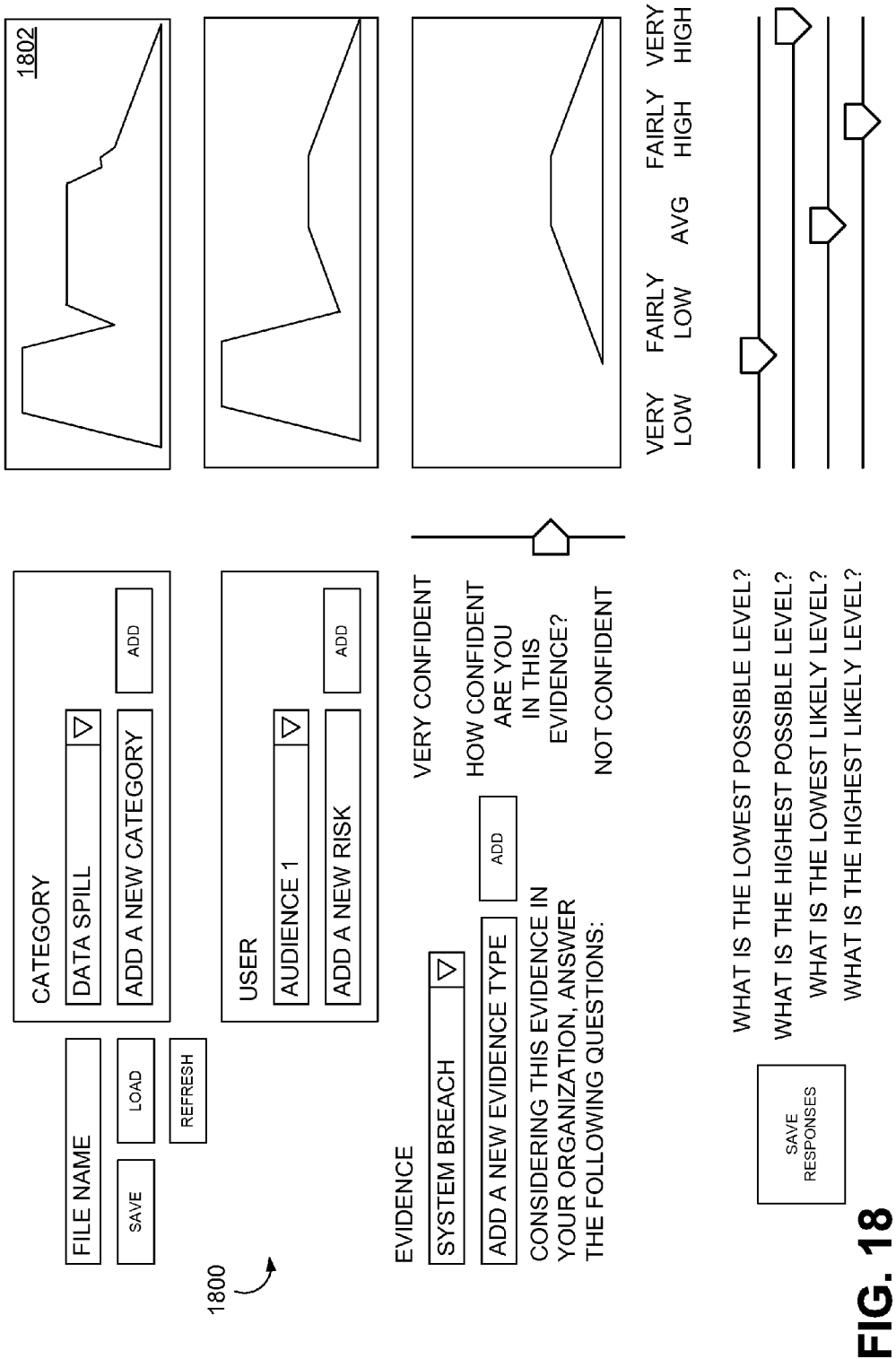

Finally, after all adjustments have been made, it is possible to obtain the fuzzy sum of all of the evidence from an embodiment of a risk analysis engine, the sum represented in the exemplary risk analysis graphics user interface (GUI) 1800 illustrated in FIG. 18. Essentially, all of the discrete representation of different kinds of evidence from different experts is obscured in the sum total shown in top display 1802 represented as a single geographic fuzzy shape. This overall analytical representation illustrates how the evidence, while quite broad, has the highest confidence (least uncertainty) at the very low to fairly low values. Indeed the evidence slopes from the lower right to the upper left indicating how the most certain evidence is in the low range, while the most uncertain evidence is in the higher ranges.

In general, the risk analysis engine and the TQN system 100 represent alternative (or complementary) directions in resolving the intractable problems of IT risk management. One issue regards the collection of empirical frequency data that correlates security events with costs of loss that result from the event. One approach to solving this problem is to develop new solutions for collecting this data. Another approach is to develop alternative mechanisms of conducting risk analysis that do not require empirical frequency data. The TQN system 100 provides an approach to collecting this data. The possibility risk analysis engine (or simply, risk analysis engine) provides an approach to risk analysis that does not require this data.

Although in one embodiment, these approaches are alternative forms of solution to the same problem, in some embodiments, these approaches collectively represent a complementary solution that can be used in concert to provide another approach to solving this intractable problem.

For instance, in one embodiment, integration involves serialization of the risk analysis engine and the TQN network 100. For example the risk analysis engine can be used as an analysis and decision-making aid in deciding what safeguards are required on the basis of the analysis provided from real-time empirical risk frequency data. This decision-making regards the managerial choice of how to react to an empirical risk analysis. For instance, what treatments are to be implemented in response to the findings of the risk analysis? The risk analysis engine can be used to collect and analyze expert opinions about whether the organization should provide self-protection (safeguards), self-insurance, or diversification of risk. In this way the risk analysis engine becomes a backend element for the TQN system 100.

In some embodiments, the two solutions can be serialized using the possibility risk analysis engine as a front end element for the TQN system 100. In such a configuration, experts capturing and entering the data regarding frequency and the costs of loss for security events can use the possibility risk analysis engine to enter their information into a networked database. In this way, expert opinions of these events and losses are kept completely confidential, as the results can only be compiled through the TQN system 100.

In some embodiments, the two solutions are not serialized. That is, parallel use of the possibility risk analysis engine and TQN system 100 can provide a mechanism for rationalizing and validating the risk analysis results developed from each solution. In this way, risk analysis benchmarks that proceed from the use of the TQN system 100 can be compared to the results of capturing expert opinions through a possibility risk analysis engine. Where the results of the two vehicles correspond, triangulation of results can be achieved that adds additional validity to the analysis. Where the results of the two solutions diverge, areas of potential error can be identified for further study and research.

In some embodiments, the possibility risk analysis engine can be used to present query results of the TQN system 100, such that a local site's known reply is presented in the context of the aggregated results. In this way, a local site can more easily evaluate its position with respect to the collective response and understand better how it might adjust its local response to particular IT security risks.

Accordingly, although some prototypes have been implemented to-date, practical application of the possibility theory and the TQN system 100 is suggested for many areas in which secure exchange of risk information is desirable. Especially important are areas where anonymity is a feature that, if assured, encourages respondents to provide more accurate and specific information. Such areas characterized by the importance of collecting specific, accurate information, but manifesting situations where respondents want to retain control of their specific data due to risk of disclosure, include IT Security (e.g., safely share information about IT security vulnerabilities, actual events and current practice, enable benchmarking of IT security risk, enable private analysis using benchmarks, revitalize ISAC (Information Sharing Analysis Center), significantly change investment practices in IT security, top current threats landscape—early warning information) and non-IT organizational secure sharing of information (e.g., health information sharing/benchmarking, CDC/health institution information sharing (e.g., epidemiology, outbreak preparedness), diversity compliance information sharing, HR compensation comparisons, airport security benchmarking, trans-border data flows for multi-national corporations, intra-organizational sharing of competitive information, SEC compliance, disaster preparedness planning, non-incriminating data exchange, internal fraud, law enforcement benchmarks, and whistleblower protection).

In some implementations, the TQN system 100 may be used in conjunction with a Risk Repository for Organizational Security (ROIS), such that the queries that are run using TQN system 100 may result in grouped information with general applicability (with no identifying information and no risk exposure). Such query results might be provided via a repository for access by the public or governmental level or by the participating organizations only. Theoretically there might be a third level of highest security where, with approval by participating organizations, information may be made available for purposes of insuring national or other high-level analysis of extreme need.

Additionally, Level I ROIS comprises public-level information, available to anyone over the Web. Level 1 ROIS may hold grouped information on the size of losses from disasters or misuse of systems in addition to demographic and organizational characteristics that may allow organizations to both compare losses across selected fields as well as benchmark their own actions/lack of actions against the norm. Among the fields collected and available at Level I include extensiveness of the computer security effort in terms of staff strength, security awareness programs, annual expenses for security software, total financial commitment to computer security, etc. Governance issues, such as who makes decisions about security privileges, may also be collected and accessible at this level.

Note that no data at this level is attributable to individual organizations. The pre-packaged information available on the public site is at the group level and group sizes are engineered to be large enough so that no inferences about individual organizations could conceivably be made.

As one example, suppose a firm is in the financial services industry, a medium-sized organization, and modestly (e.g., governance is decentralized and that the policies of the central security group are sometimes followed and sometimes not) secured in terms of its systems. So firewalls, encryption, and access control software are being used in the organization, but not at all times and in all the ways they should be implemented. Further, suppose this firm would like to compare its relative level of security against other firms in its class. How would it use the repository to answer questions about its risk and its current investment in security? The firm could use ROIS to find risk data on firms that were similar to itself by industry, size, and security orientation. Pre-packaged, cross-tabulated tables would have means and counts that could be used for this analysis. It could then compare its management practices in securing systems to this benchmark group. It could also determine whether its losses and current investments were aligned well with these norms.

As another example implementation, Level II ROIS is a shared level, available to only participating organizations. It is anticipated that firms will be willing to participate, in large part, because of the value of this secured "view" of the database. Access to the shared level is through an Extranet hosted by a secure model similar to the TQN coordinator 108, and firewalls and access control prohibit access to anyone who does not have an authorized id and password. Access is to a "statistical" database where the real data is "perturbed" to allow users to query the database and run statistical tests that produce accurate results, but not allow users to deduce values for other participating organizations.

Unlike the publicly accessible Level I ROIS, organizations that have access to Level II ROIS will also be able to use more sophisticated approaches to benchmark themselves against other organizations of interest. The dataset that they would be able to extract may include their own data as well as the perturbed data of other organizations. Perturbed data retains the appropriate distributions, standard deviations, etc., without making it possible to "guess" the identity of individual organizations through the process of systematic inquiry known as "trackers".

Note, therefore, that no data at Level II ROIS is attributable to individual organizations. The master list of participating organizations can be off-line in a non-networked file. A randomly generated id or code for individual organizational "perturbed" data is all that would appear in the Level II repository.

For organizations that were interested, statistical analyses may be run on various demographic, organizational, security, and loss characteristics in the database. It is anticipated that organizations would use this feature less than researchers who would, hopefully, have theories that they wished to test. Academics, thus, whose organizations participated in the building of the repository would also be a major beneficiary of Level II shared, secured data. As the years went by, this archive could spawn studies in changing features of the security landscape.

Level III ROIS is a private level, available only to a restricted user base (as determined appropriate by the participants of the particular TQN federation, in concert with others such as national security or law enforcement personnel). This repository includes all data gathered, including the individualized records of participating organizations. The database is kept on a standalone, secured PC in a locked room. This PC is not networked in any way. Periodic backups are made to an external hard disk that is cycled to a locked, off-site storage facility.

Data (e.g., the queries that are run using TQN system 100 that result in grouped information with general applicability (with no identifying information and no risk exposure) is entered into the system via the Web (this is not the identifying data that is included at ROIS level III that is therefore updated out of band without connection to any network). SSL encryption protects the transmission between individual organizations and the secure server. As for data related to queries poised by members, since all TQN queries results in group data, the ROIS repository storage of such results is inherently secure and would not compromise any organization by sharing of such aggregated risk data.

As indicated above, the potential uses for certain embodiments of the TQN systems and methods are not limited to the security arena, but can be used in any situation in which a group of organizations have sensitive data that is valuable for generating metrics and benchmarks that can benefit all the participating organizations, but where sharing the data carries risk if exposed. There are numerous examples of such situations in areas ranging from homeland security, to healthcare, or to the corporate sector.

In some embodiments, the identity process (authenticating who participates and authorizing participation—the TQN coordinator service site registry) may be separate from the functions of the query processing. For instance, users may be validated (e.g., a federated identity process agreed to by participants) and an anonymous "ticket" or "handle" or "certificate" may be issued that is used to gain authorized access to the query engine. In this manner, while it is recognized by the TQN system that the authentication is done based on an identity, the subsequent query is done by a masked user (essentially, a user's direct identity is subsumed into an "aggregated crowd' of other users).

It should be emphasized that the above-described embodiments are merely possible examples of implementations, merely set forth for a clear understanding of the principles of the TQN systems and methods and variations thereof. Many variations and modifications may be made to the above-described embodiment(s). All such modifications and variations are intended to be included herein within the scope of this disclosure.

At least the following is claimed:

1. A method for collecting responses to a question from multiple query participants, the method comprising:
   a TQN coordinator initializing a query message to be sent to the query participants, the query message including a question to be answered by the query participants;
   the TQN coordinator adding obfuscating data to the query message to be used to obfuscate participant answers to the question;
   the TQN coordinator sending the query message along a randomized path over a network to the query participants;
   each of the query participants receiving the query message, adding to the obfuscating data of the query message its answer to the question, and sending the query message to a next participant along the randomized path or to the TQN coordinator if the query participant is the last of the participants to respond;
   the TQN coordinator receiving an obfuscated cumulative result from the query participants that comprises a summation of the obfuscating data and each query participant's answer; and
   the TQN coordinator removing the obfuscating data from the obfuscated cumulative result to obtain a query result.

2. The method of claim 1, further comprising the TQN coordinator sending the query result to the query participants.

3. The method of claim 1, further comprising the TQN coordinator receiving the question from a first participant among the query participants.

4. The method of claim 3, further comprising the TQN coordinator authenticating the first participant.

5. The method of claim 1, further comprising, prior to sending the query message, the TQN coordinator determining the respective data release policies of the query participants, the data release policies comprising information indicating one or more of a willingness or unwillingness to participate.

6. The method of claim 5, further comprising the TQN coordinator determining based on the information whether a quorum exists for sending the query message.

7. The method of claim 6, further comprising the TQN coordinator determining the randomized path on which the query message will travel responsive to a determination that the quorum exists.

8. A program stored on a non-transitory computer readable medium, the program comprising code executed by a computing device to perform the following steps:
   encapsulating a question to be answered by query participants in a query message;
   adding obfuscating data to the query message that will obfuscate answers to the question added to the query message by the query participants;
   determining a randomized path among the query participants along which the query message will travel;
   sending the query message along the randomized path to commence aggregation of query participant answers with the obfuscating data; and
   receiving an obfuscated cumulative result from the query participants that comprises a summation of the obfuscating data and each query participant's answer to the question.

9. The program of claim 8, further comprising code executed by the computing device to perform the step of removing the obfuscating data
   from the obfuscated cumulative result to obtain a final result corresponding to a cumulative total of the query participant answers.

10. A system for collecting responses to a question from multiple query participants, the system comprising:
   a trusted query network (TQN) coordinator configured to:
     initialize a query message to be sent to the query participants, the query message including a question to be answered by the query participants,
     add obfuscating data to the query message to be used to obfuscate participant answers to the question, and
     send the query message along a randomized path over a network to the query participants; and
   multiple query participants, each query participant being configured to:
     receive the query message,
     add to the obfuscating data of the query message its answer to the question, and
     send the query message to a next participant along the randomized path or to the TQN coordinator if the query participant is the last of the participants to respond;
   wherein the TQN coordinator is further configured to:
     receive an obfuscated cumulative result from the query participants that comprises a summation of the obfuscating data and each query participant's answer, and
     remove the obfuscating data from the obfuscated cumulative result to obtain a query result.

11. The system of claim 10, wherein the TQN coordinator is further configured to send the query result to the query participants.

12. The system of claim 10, wherein the TQN coordinator is further configured to receive the question from a first participant among the query participants.

13. The system of claim 12, wherein the TQN coordinator is further configured to authenticate the first participant.

14. The system of claim 10, wherein the TQN coordinator is further configured to determine the respective data release policies of the query participants, the data release policies comprising information indicating one or more of a willingness or unwillingness to participate.

15. The system of claim 14, wherein the TQN coordinator is further configured to determine based on the information whether a quorum exists for sending the query message.

16. The system of claim 10, wherein the TQN coordinator is further configured to determine the randomized path on which the query message will travel responsive to a determination that the quorum exists.

17. The system of claim 10, wherein the obfuscating data the TQN coordinator is configured to add is a number.

18. The system of claim 10, wherein the answers the query participants are configured to add to the obfuscating data are numbers that answer the question.

19. The method of claim 1, wherein the TQN coordinator adding obfuscating data to the query message comprises the TQN coordinator adding a number to the query message.

20. The method of claim 1, wherein the query participants adding to the obfuscating data its answer to the question comprises the query participants adding a number to the obfuscating data that answers the question.

* * * * *